United States Patent [19]
Hayashi et al.

[11] Patent Number: 5,679,433
[45] Date of Patent: Oct. 21, 1997

[54] NONCOMBUSTIBLE SHEET, NONCOMBUSTIBLE LAMINATED SHEET, NONCOMBUSTIBLE HONEY COMB STRUCTURAL MATERIAL, NONCOMBUSTIBLE BOARD, NONCOMBUSTIBLE MOLDED PRODUCT, AND MANUFACTURING METHOD THEREOF

[75] Inventors: Kenzo Hayashi; Kozo Hayashi, both of Kakamigahara; Akio Ito, Gifu; Koji Tsuchiya, Mino; Kyoichi Fujimoto, Kani, all of Japan

[73] Assignee: Kabushiki Kaish Tokiwa Denki, Kakamigahara, Japan

[21] Appl. No.: 838,559

[22] Filed: Feb. 19, 1992

[30] Foreign Application Priority Data

| Oct. 31, 1991 | [JP] | Japan | 3-286013 |
| Nov. 11, 1991 | [JP] | Japan | 3-294414 |
| Nov. 29, 1991 | [JP] | Japan | 3-316326 |
| Dec. 11, 1991 | [JP] | Japan | 3-327837 |
| Dec. 11, 1991 | [JP] | Japan | 3-327838 |

[51] Int. Cl.⁶ .......................... B32B 9/00
[52] U.S. Cl. .......... 428/116; 428/73; 428/117; 428/304.4; 428/317.9; 428/372; 428/910; 428/920; 442/414
[58] Field of Search .......... 428/334, 454, 428/283, 281, 288, 324, 372, 224, 254, 257, 304.4, 290, 117, 404, 446, 920, 73, 317.9, 116, 910

[56] References Cited

U.S. PATENT DOCUMENTS

| 3,616,196 | 10/1971 | Sun | 161/227 |
| 3,901,991 | 8/1975 | Ueda et al. | 428/446 |
| 4,043,862 | 8/1977 | Roberts | 428/334 |
| 4,061,812 | 12/1977 | Gilwee, Jr. et al. | 428/117 |
| 4,472,478 | 9/1984 | Briggs et al. | 428/283 |
| 4,557,973 | 12/1985 | Ali | 428/406 |
| 4,808,780 | 2/1989 | Seaborne | 219/10.55 |
| 5,182,163 | 1/1993 | Wheat et al. | 428/224 |

FOREIGN PATENT DOCUMENTS

| 1002073A34 | 6/1990 | Belgium . |
| 2475970 | 8/1981 | France . |
| 3013223 | 10/1980 | Germany . |
| 47-45602 | 11/1972 | Japan . |
| 51-88799 | 8/1976 | Japan . |
| 52-32891 | 3/1977 | Japan . |
| 55-37297 | 9/1980 | Japan . |
| 56-47236 | 11/1981 | Japan . |
| 56-165097 | 12/1981 | Japan . |
| 57-99 | 1/1982 | Japan . |
| 57-20853 | 5/1982 | Japan . |
| 57-20854 | 5/1982 | Japan . |
| 57-58480 | 12/1982 | Japan . |
| 58-95636 | 6/1983 | Japan . |
| 58-144196 | 8/1983 | Japan . |
| 58-43140 | 9/1983 | Japan . |

(List continued on next page.)

OTHER PUBLICATIONS

"Ullmann's Encyclopedia of Industrial Chemistry," vol. A11, 1988, pp. 252–253.
Derwent Publications Ltd., Database WPIL, Section Ch, Week 8916.

*Primary Examiner*—Patrick J. Ryan
*Assistant Examiner*—Abraham Bahta
*Attorney, Agent, or Firm*—Burns, Doane, Swecker & Mathis

[57] ABSTRACT

A noncombsutible material is produced by making paper from a slurry essentially consisting of a sepiolite as a main material, an inorganic fiber or a glass fiber as a reinforcer, a first binder composed of PAA (polyacrylamide) as a thermoplastic resin, and a second binder composed of EPA (polyamide-polyamine-epichlorohydrine) as a thermosetting resin. The noncombustible material is given incombustibility and water resistance by the main material of the sepiolite, so that its productivity is improved thereby enabling a paper making of low costs.

19 Claims, 19 Drawing Sheets

FOREIGN PATENT DOCUMENTS

| | | |
|---|---|---|
| 58-208164 | 12/1983 | Japan . |
| 58-208178 | 12/1983 | Japan . |
| 58-208179 | 12/1983 | Japan . |
| 58-55280 | 12/1983 | Japan . |
| 59-21799 | 2/1984 | Japan . |
| 59-21800 | 2/1984 | Japan . |
| 59-6697 | 2/1984 | Japan . |
| 60-5049 | 1/1985 | Japan . |
| 60-227833 | 11/1985 | Japan . |
| 60-250945 | 12/1985 | Japan . |
| 61-136438 | 6/1986 | Japan . |
| 61-258099 | 11/1986 | Japan . |
| 61-296200 | 12/1986 | Japan . |
| 62-26306 | 6/1987 | Japan . |
| 62-186144 | 8/1987 | Japan . |
| 63-36886 | 2/1988 | Japan . |
| 63-19465 | 4/1988 | Japan . |
| 63-159242 | 7/1988 | Japan . |
| 63-178033 | 7/1988 | Japan . |
| 63-190637 | 8/1988 | Japan . |
| 63-201048 | 8/1988 | Japan . |
| 63-201050 | 8/1988 | Japan . |
| 63-224734 | 9/1988 | Japan . |
| 63-235600 | 9/1988 | Japan . |
| 63-44760 | 9/1988 | Japan . |
| 63-66785 | 12/1988 | Japan . |
| 64-61599 | 3/1989 | Japan . |
| 2-180633 | 7/1990 | Japan . |
| 2-180634 | 7/1990 | Japan . |
| 2-191635 | 7/1990 | Japan . |
| 2-87646 | 7/1990 | Japan . |
| 2-277546 | 11/1990 | Japan . |
| 3-186320 | 8/1991 | Japan . |
| 3-61581 | 9/1991 | Japan . |

FIG. 2

| NO. | | 1 | 2 | 3 | 4 | 5 |
|---|---|---|---|---|---|---|
| MIXING RATIO (% BY WEIGHT) | EPA | 2.0 | 2.0 | 2.0 | 2.0 | 2.0 |
| | PAA | 0.07 | 0.10 | 0.15 | 0.20 | 0.30 |
| FILTRATING TIME (SEC.) | | 100 | 85 | 35 | 10 | 5 |

FIG. 3

| NO. | | 1 | 2 | 3 | 4 | 5 |
|---|---|---|---|---|---|---|
| MIXING RATIO (% BY WEIGHT) | EPA | 2.0 | 2.0 | 2.0 | 2.0 | 2.0 |
| | PAA (FOR FLOCCULATION) | 0.2 | 0.2 | 0.2 | 0.2 | 0.2 |
| | PAA (FOR INCREASING PAPER STRENGTH) | 1.0 | 1.5 | 2.0 | 2.5 | 3.0 |
| FILTRATING TIME (SEC.) | | NOT MORE THAN 2.0 | NOT MORE THAN 2.0 | NOT MORE THAN 2.0 | 12 | 25 |

FIG. 4

| NO. | | | 1 | 2 | 3 | 4 | 5 | TEST METHOD |
|---|---|---|---|---|---|---|---|---|
| MIXING RATIO (% BY WEIGHT) | PAA (FOR FLOCCULATION) | | 0.2 | 0.2 | 0.2 | 0.2 | 0.2 | |
| | PAA (FOR INCREASING PAPER STRENGTH) | | 2.0 | 2.0 | 2.0 | 2.0 | 2.0 | |
| | EPA | | 0 | 0.5 | 1.0 | 1.5 | 2.0 | |
| BASIS WEIGHT | (g/m²) | | 106 | 112 | 120 | 118 | 124 | JIS P-8124 |
| PAPER THICKNESS | (mm) | | 0.323 | 0.319 | 0.338 | 0.301 | 0.303 | JIS P-8118 |
| TENSILE STRENGTH | (kgf) | | 0.50 | 1.18 | 1.73 | 2.68 | 2.90 | JIS P-8113 |
| DUCTILITY | (%) | | 1.6 | 1.8 | 1.8 | 2.1 | 1.6 | MEASURING DUCTILITY BY TENSION |
| WET TENSILE STRENGTH | (kgf) | | UN-MEASURABLE | UN-MEASURABLE | 0.90 | 1.20 | 1.32 | JIS P-8135 (DIPPING UNDER-WATER 10 MIN.) |

FIG. 5

| UNDERWATER DUCTILITY | | SAMPLE OF INVENTION (FIG. 4 NO. 4) | COMPARISON SAMPLE (ONE ON SALE) |
|---|---|---|---|
| 1 HOUR DIPPING (%) | MACHINE DIRECTION | 0.1 | 0.1 |
| | CROSS DIRECTION | 0.2 | 1.1 |
| 24 HOURS DIPPING (%) | MACHINE DIRECTION | 0.2 | 0.2 |
| | CROSS DIRECTION | 0.3 | 1.2 |

TEST METHOD : ACCORDING TO TAPPI NO. 27A METHOD
(MEASURING NATURAL DUCTILITY AFTER DIPPING UNDERWATER A FIXED TIME AND LEAVING)

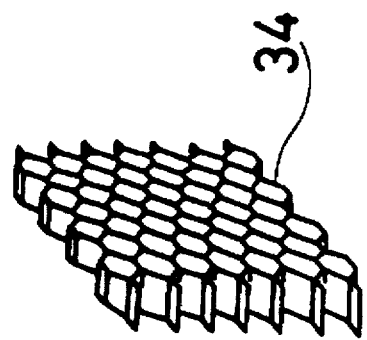 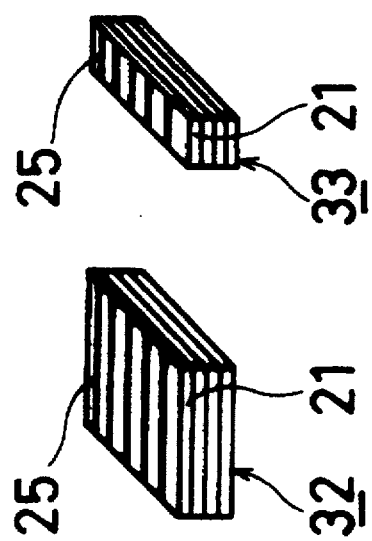 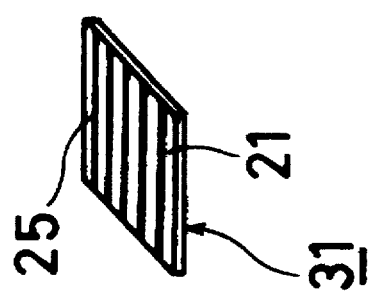 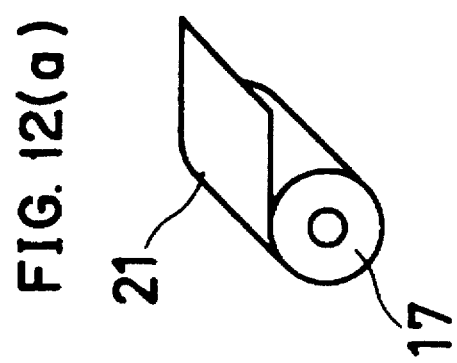
FIG. 12(a) FIG. 12(b) FIG. 12(c) FIG. 12(d) FIG. 12(e)

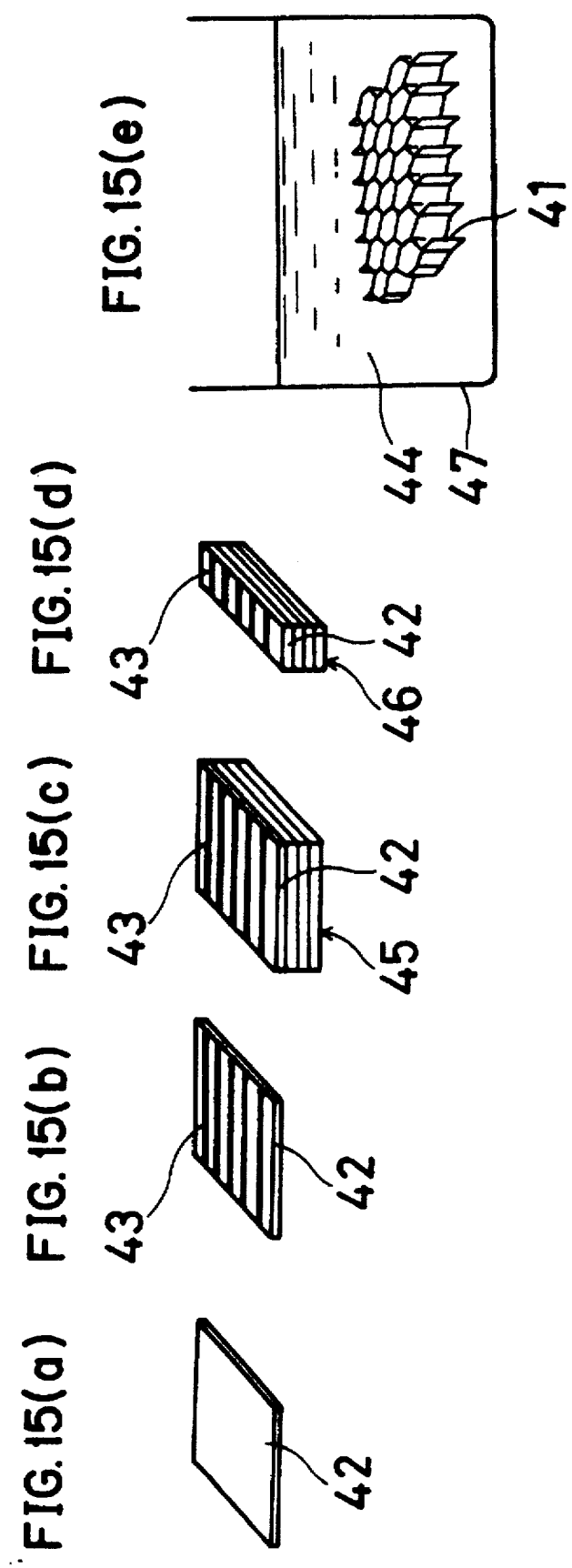

NONCOMBUSTIBLE SHEET, NONCOMBUSTIBLE LAMINATED SHEET, NONCOMBUSTIBLE HONEY COMB STRUCTURAL MATERIAL, NONCOMBUSTIBLE BOARD, NONCOMBUSTIBLE MOLDED PRODUCT, AND MANUFACTURING METHOD THEREOF

BACKGROUND OF THE INVENTION

1. Field of the Invention

This invention relates to a noncombustible sheet used as wall decorating materials, heat resisting decorative sheets or the like, and a manufacturing method thereof, particularly to a noncombustible sheet which has imcombustibility and heat resistance as well as good productivity, and a manufacturing method thereof.

This invention also relates to a noncombustible laminated sheet which has a metallic foil and a noncombustible sheet piled up and which is used as construction materials that require heat resistance and imcombustibility, and a manufacturing method thereof. The "sheet" herein defined is not limited into a thin one but also includes a thick one.

This invention further relates to a noncombustible honey comb structural material and a noncombustible board each of which has heat resistance and incombustibility, which is light weight and highly strong, and which can be used as partition walls for building materials, panel cores for sliding type or other type of doors and floors, and structural materials for airplanes, interior panels for railroad vehicles or the like.

This invention still further relates to a noncombustible molded product which is molded in a state of wet sheet (web) by using a molding die in a slurry and dried and solidified, and which is used as pipe arrangements like pipes and elbows, building materials like wall decorating materials having concavo-convex surfaces, household paper products, or craftworks like reliefs, and a manufacturing method thereof, particularly to a noncombustible molded product which has water resistance as well as incombustibility and which can be mass produced at low costs, and a manufacturing method thereof.

2. Description of the Related Art

Related Art Concerning Noncombustible Sheet

In recent years, there has been taken up a problem of flame proofing or fire proofing in building interior materials as well as in plastics and clothes, and rather strict regulation has been introduced therefor. Paper is not an exception and there are many demands for so called flame proofing or noncombsutible sheets that are not burnt but sturdy to heat, starting with wall decorating materials.

In conventional inorganic fibers, asbesto papers are typical fire-proof ones for general purposes. The asbesto papers are excellent in every aspects such as flame resistance, heat resistance, high strength, easy production, and low price, and have coverd applied fields or have had wide applications which were difficult to be dealt with by organic fibers.

Here, mentioning character of asbestos, general asbestos are made from ores like olivine or augite, which are crystallized into fibrous structure so as to be serpentine or amphibolite by hydrothermal reaction of geotherm and ground water in a crust under high pressure. Among them, chrysotile asbestos of serpentine system are commonly used kinds for paper making materials. Chemical formula thereof is $3MgO-2SiO_2-2H_2$). Fiber diameter thereof is very small, namely 20 to 40 mm, and flexible. Hardness thereof is low or 2.5 to 4.0, this is the reason why that kind of asbestos are used for abrasion agents. They are comformable with water in case of paper making, since they contain crystal water. They have good adsorptivity and scavenging in mixing with other additives, since the chrysotile are electrified into cations in the water. This physical property brings out advantages of inorganic fibers such as, when made into paper sheets, they are strong, fire proofed, flexible, smooth-faced and easy to paper-make.

However, the asbestos have been gradually prohibited from use recently in Japan, because of their bad influence to health.

Under this circumstances, alternates similar to the asbestos are enthusiastically researched and developed these days in every places, together with development of new materials. Highly efficient inorganic fibers or whiskers, have been developed one after another. For instance, somewhat popularly used are carbon fibers of pitch system for general purposes, potassium titanate fibers, alumina-silica fibers, glass fibers, etc. Other examples are plaster fibers, basic magnesium sulfate fibers, phosphoric acid fibers, pyroboric acid magnesium fibers, etc. However, the fact is that these fibers are not so much practical as to be alternate of asbestos, in the terms of uses, productivity, prices, etc.

Otherwise, there is a processing for fire proofing as a means for making paper hard to burn. This is a means adopted in wall papers, Japanese sash papers, paper heat exchangers, etc., and can be called a processing for preventing catch of fire. A base material thereof is obtained by impregnating or coating wood pulp paper like kraft paper with antiflaming agent. The antiflaming agent is ammonium salt complex type aqueous inorganic salt, phosphorus complex nitrogen compound, phosphorus complex hologen compound, antimonytrioxide-halogen compound, boron compound, halogen compound or the like. However, this means if primarily composed of organic substances, so that it is never deemed as perfectly noncombustible. Aromatic polyamide fibers as highly efficient fibers are not for general purposes.

Under the circumstances, there have been required more intensely developments of alternates using other fibers in fields where the asbesto fiber paper cannot be used. In terms of uses for general purposes, there are needs in every fields such as wall decorating materials, sealants, gaskets, packings, asphalt roofings, cushion floors, noncombustible cores, building material decorative paper, laminated paper, or heat insulating materials.

Among them, an attention is paid to utility of sepiolite as an alternate of asbestos among conventional natural fibers. There are many noncombustible sheets that use sepiolite fibers.

Here, the sepiolite is a clay mineral which is commonly called a mountain leather, a mountain cork, or a montain wood. "Kaiho-seki" in Japan is one kind thereof. It looks like a cork, a leather or a white soft lump, but it is a lump of magnesium silicate. It is classified in one dimensional structure clay by the classification, however, it can be taken as brick laying crystalline three dimensional structure which is easy to chip or cut in a certain direction, if viewed from another angle. It forms a crystal system group consisting of silicon, magnesium, oxygen, hydroxyl group and crystal water. Regarding its physical property, adsoptivity, thioxiotropy and consolidativity are basic characters.

There are some cases of paper making that use the property thereof, such as techniques described in the Japanese Laid Open Patent Publications, Nos. 51-88799, 55-155097, 58-95636, 58-144196, 59-21800, 51-258099, 63-235600, 54-61599 and the like.

Prior Art Concerning Noncombustible Laminated Sheet

Next, in prior art of laminated sheets, a laminated sheet which is made of an aluminium foil and a plastic film, a paper sheet, a cloth or the like is widely used for a variety of wrapping materials, electotric or electronic materials such as a wrapper, a container, a flexible printed board, and a conductive adhesive tape, and, in addition thereto, building materials, industrial materials, etc.

The matallic foil is generally used in such a manner that an aluminium foil or the like is stuck to a heat insulating material such as a glass wool or a rock wool for the purpose of heat prevention or thermal insulation of building materials.

In a hot insulation of pipe arrangements, an aluminium foil of a single sheet is embossed or corrugated and used to be wound around pipes. In case this aluminium foil is used for the hot insulation of the pipe arrangements, air layer is formed between the foil and the pipe, thus thermally shielding outside air, carrying out heat insulation and hot insulation and protecting the interior of the pipes.

Prior Art Concerning Noncombustible Honey Comb Structural Material and Noncombustible Board Next, concerning conventional honey comb structural materials, widely used are paper honey comb which is made of a card board formed into a honey comb and which is light weight and cheap and easy to handle while having a strength to a certain degree.

However, the paper honey comb is easy to burn and unsuitable for places where high rigid strength is required, since it is chartaoeous.

Japanese Laid Open Utility Model Publication No. 2-87646 shows a technique in which paper and a metallic foil is laminated to be a honey comb. However, it has a portion made of paper, so that it is not good in places where incombustibility is necessary, too.

Therefore, paper composed of asbestos have been used so far in case the above character is needed. However, the asbestos have been prohibited from use recently since it have bad influences on the health.

Accordingly, honey comb cores of laminated metallic foils such a aluminum or stainless are used as structural materials usually where there are required light weight, incombustibility and high rigidity.

The honey comb structural material of the metallic foils has high rigid strength owing to its structural character though it is light weight. Thus it is used in every kinds of structural materials for air planes, railroad vehicles, building materials, etc.

However, the honey comb structural materials are very much expensive compared with the paper honey comb since they use the metallic foils.

Therefore, Japanese Laid Open Patent Publications Nos. 60-250945 and 63-178033 disclose a technique of a honey comb structural material which uses paper including aluminium hydroxide so as to improve fire retardancy.

Prior Art Concerning Noncombustible Molded Products

Next, there are conventional molded products which have paper sheets or the like pressed to and molded by a shape or the like in a wet condition and under a room temperature. The molded sheets have character that they are easy to handle, cheap, light weight, unique to the touch, etc. Thereby they are used for household paper products like dishes and cups, craftworks like reliefs. They are also used for industrial products like packings, filters and heat exchangers made of sheets, etc. However, these molded sheets are combustible and easy to rupture. Moreover, they lack water resistance without special treatment on the surfaces. Due to these bad points, their uses are naturally limited.

Problem Concerning Noncombustible Sheet

The noncombustible sheets described in the above publication are mostly composed of inorganic fibers like ceramic fibers or the like, or a cloth or organic fibers, or both the inorganic and organic fibers and sepiolite that is rich in adsorptivity, thixotropy and consolidability. The fibers and sepiolite are processed by mixing and dispersing and dried thereafter, while the sepiolite is used only auxiliarily. This is because it is difficult to make paper from the sepiolite as a main material because of the reasons as follows. The fibers of sepiolite are fine and poor in freeness in case of paper making. It is hard to make a desired form of sheet from the sepiolite and its tearing strength is poor, in case of adding flocculant in the amount of 0.01 to 0.1% to a raw material, that is the amount added in a common slurry of good freeness composed of wood pulp, syntetic resin fibers, inorganinc fibers or the like. If the amount of added flocculant is not less than 0.1% to the raw material, the freeness cannot be improved, but an excessive addition enlarges viscosity of the slurry and decreases its paper making efficiency. Therefore, it is very hard to industrially manufacture the sheets of sepiolite on a mass-production basis, while an experimental production of small quantity is possible. Thus the excellent character of the sepiolite has not been developed to its fullest. Japanese Laid Open Patent Publication No. 59-21800 barely mentions a use of sepiolite alone, however, it lacks description of concrete technical details or wants practical use.

Problem Concernig Noncombustible Laminated Sheet

Concerning noncombustible laminated sheets, a conventional sheet which laminates matallic foil with plastic film or the like are poor in heat resistance. It is not available, since it melts or burns under a high temperature or in a place required of noncombustibility.

On the other hand, a sheet having a metallic foil alone, which is embossed and corrugated, is sometimes required to make its film thickness large in order to increase strength and rigidity. However, in case the metallic foil has a thickness of twenty micrometer or more according to a depth or irregularity of corrugation, there arise cracks and ruptures in embossing and corrugating, due to a property of poor visco-elasticity of the matallic foil. Therefore, it is difficult to fold these noncombustible sheets. Thus, generally speaking, there is a limit in the film thickness of the metallic foil that is available for folding process.

There is a heat insulation sheet made of a heat insulating material such as glass wool or rock wool and an aluminium foil stuck thereto. It starts softening at an atmosphere temperature of about 400 degrees centigrade, and cannot hold a fixed shape of the sheet. Therefore, it is available only under a condition of comparatively low temperature.

Problem Concerning Noncombustible Honey Comb Structural Material and Noncombustible Board Concerning a noncombustible honey comb structural material and a noncombustible board, a conventional honey comb structural material of a metallic foil, for example, a common one of aluminium starts softening at an atmosphere temperature of about 400 degree centigrade. It cannot maintain its original shape under a high temperature above that, and is available in limited places.

Moreover, it is very expensive compared with the paper honey comb.

Tough the ones described in the Publications Nos. 60-250945 and 63-178033 are fire retardant, they are relatively easy to burn, because it is indispensable to mix pulp in about 30% in order to improve its flexural strength. It is possible to raise its fire retardancy to a certain degree by impregnating diatomaceous earth, urea-melamine or the like. However, it has no automorphic character and is easy to break. Therefore, it is available in rather limited places tough fire retardant.

On the other hand, a plaster board is sometimes used as a lining material for a partition wall material. However, there is a problem that the plaster board is heavy and easy to crack.

Problem Concerning Noncombustible Molded Product

Next, concerning a noncombustible molded sheet, the above mentioned publication mostly relate to the ones made of inorganic fibers like ceramic fibers, or a cloth or organic fibers, or both the inorganic and organic fibers and the sepiolite which is rich in adsorptivity, thioxotropy and consolidability, while the fibers and sepiolite are processed by mixing and dispersing and dried. This is because it is difficult to make paper from the sepiolite as a main material due to the facts as follows. The sepiolite is fine fibers, so that it is hard to make a desired shape of sheet due to its poor freeness and tearing strength, in case of making paper therefrom. Therefore, it is of course difficult to mold a sheet by making paper by use of a shaping die made of a wire cloth in a slurry. As a result, excellent property of the sepiolite have not been developed to its fullest. Japanese Laid Open Patent Publication No. 59-21800 barely mentions a use of sepiolite alone, however, it lacks description of concrete technical details or wants practical use.

There are a lot of cases that the sheet is required to be antiflaming and imcombustible as well as to have high strength and water resistance. However, there is few description of a technique regarding water resistance in the above publication. The Publication No. 59-21800 barely shows an inorganic paper filter mixed with a small quantity of synthetic resin like silicone or Teflon (polytetrafluoroethylene) so as to improve water resistance, heat resistance and chemical resistance. However, it is used for a filter paper, and does not disclose a definite technical details. Therefore, there is a fear that it lack utility like the above.

SUMMARY OF THE INVENTION

In view of the above, it is a first object of the invention to provide a noncombustible sheet and its manufacturing method, which has incombusitibility and water resistance by using a sepiolite as a main material, and which improves productivity to enable paper making on mass-production basis and at low costs.

It is a second object of the invention to provide a noncombustible laminated sheet and its manufacturing method, which enables a folding without any rupture even if a metallic foil constituting a part thereof is relatively thick, and which has incombustibility to keep a fixed shape so as to fit for use under a high temperature.

It is a third object of the invention to provide a noncombustible honey comb structural material, a noncombustible board, and their manufacturing methods, each of which is noncombustible so as to keep a fixed shape when used under a high temperature, and which can be produced at low costs.

It is a fourth object of the invention to provide a noncombustible molded product and its manufacturing method, which is noncombustible and water resistant, and which can be mass-produced by molding a slurry.

According to a preferred mode of the invention, a noncombustible sheet is made of a slurry essentially consisting of a sepiolite as a main material, a first binder for fixation composed of a thermoplastic resin, and a second binder for flocculation and water resistance composed of a thermosetting resin.

According to another preferred mode of the invention, a noncombustible sheet is made of a slurry essentially consisting of a sepiolite as a main material, a first binder for fixation composed of a anion thermoplastic resin, a second binder for flocculation and water resistance composed of a cation thermosetting resin, a third binder for flocculation composed of an anion thermoplastic resin, and a fourth binder for flocculation composed of a cation thermoplastic resin.

According to other preferred modes of of the invention a noncombustible sheet is made with an inorganic fiber as a reinforcer.

According to another preferred mode, a noncombustible sheet is made from a slurry essentially consisting of a sepiolite as a main material, and a high molecular flocculant composed of a mixture of a strong cation polymer and a strong anion polymer in a total amount of 0.2 to 1.0% by weight to a solid content of the slurry.

According to another preferred mode, a method of manufacturing a noncombustible sheet comprises a step for making paper from a slurry, the slurry essentially consisting of a sepiolite as a main material, and a high molecular flocculant composed of a mixture of a strong cation polymer and a strong anion polymer is a total amount of 0.2 to 1.0% by weight to a solid content of the slurry.

According to another preferred mode, a noncombustible laminated sheet comprises a metallic foil, a noncombustible sheet, and an inorganic adhesive joining the metallic foil and the noncombustible sheet.

According to another preferred mode, a method of manufacturing a noncombustible laminated sheet comprises a feeding step for feeding a metallic foil and a noncombustible sheet to a press section, respectively; a coating step for coating an inorganic adhesive on at least one of the metallic foil and the noncombstible sheet; and a joining step for joining, by laminating and pressing, the metallic foil and the noncombustible sheet which are delivered after the coating step.

According to another preferred mode, a noncombustible honey comb structural material comprises a plurality of laminated sheets piled up on each other in a honey comb structure, each laminated sheet including a metallic foil, a noncombustible sheet and a first inorganic adhesive joining the metallic foil and the noncombustible sheet; and a second inorganic adhesive coated between and joining the laminated sheets.

According to another preferred mode, a method of manufacturing a noncombustible honey comb structural material comprises a laminating step for joining a metallic foil and a noncombustible sheet via a first inorganic adhesive; a coating step for coating a second inorganic adhesive in a plurality of lines of a fixed width at constant intervals on a laminated sheet obtained in the laminating step; a pressing step for overlapping a plurality of laminated sheets while alternately shifting positions of the second inorganic adhesive coated thereon by half pitches of the intervals therebetween; a cutting step for cutting an overlapped sheet obtained in the pressing step into a fixed width; and an expanding step for expanding a cut overlapped sheet obtained in the cutting step toward opposite directions so as to form a honey comb core.

According to another preferred mode, a noncombsutible honey comb structural material comprises a plurality of noncombustible sheets piled up on each other in a honey comb structure, each laminated sheet being made from a slurry mainly composed of a sepiolite, and an inorganic adhesive coated between and joining the noncombustible sheets.

According to another preferred mode, a noncombustible honey comb structural material comprises a plurality of noncombustible sheets piled up on each other in a honey comb structure, each laminated sheet being made from a slurry mainly composed of a sepiolite, an inorganic adhesive coated between and joining the noncombustible sheets, and an inorganic impregnant coated on a whole surface of the noncombustible sheets in the honey comb structure.

According to another preferred mode, a noncombustible honey comb structural material comprises a plurality of noncombustible sheets piled up on each other in a honey comb structure, each laminated sheet being made from a slurry mainly composed of a sepiolite; and a vinyl acetate adhesive coated between and joining the noncombustible sheets.

According to another preferred mode, a noncombustible honey comb structural material comprises a plurality of noncombustible sheets piled up on each other in a honey comb structure, each laminated sheet being made from a slurry mainly composed of a sepiolite; a vinyl acetate adhesive coated between and joining the noncombustible sheets; and an inorganic impregnant coated on a whole surface of the noncombustible sheets in the honey comb structure.

According to another preferred mode, a noncombustible board comprises a noncombustible honey comb structural material including a plurality of noncombustible sheets piled up on each other in a honey comb structure, each noncombustible sheet being made from a slurry mainly composed of a sepiolite, and an inorganic adhesive coated between and joining the noncombustible sheets; and a pair of noncombustible plate stuck on opposite surfaces of the noncombustible honey comb structural material via an inorganic adhesive, each noncombustible plate being made from a slurry mainly composed of a sepiolite.

According to another preferred mode, a noncombustible board comprises a noncombustible honey comb structural material including: a plurality of noncombustible sheets piled up on each other in a honey comb structure, each laminated sheet being made from a slurry mainly composed of a sepiolite, an inorganic adhesive coated between and joining the noncombustible sheets, and an inorganic impregnant coated on a whole surface of the noncombustible sheets in the honey comb structure; and a pair of noncombustible plate stuck on opposite surfaces of the noncombustible honey comb structural material via an inorganic adhesive, each noncombustible plate being made from a slurry mainly composed of a sepiolite.

According to another preferred mode, a noncombustible board comprises a noncombustible honey comb structural material including: a plurality of noncombustible sheets piled up on each other in a honey comb structure, each noncombustible sheet being made from a slurry mainly composed of a sepiolite, and a vinyl acetate adhesive coated between and joining the noncombustible sheets; and a pair of noncombustible plate stuck on opposite surfaces of the noncombustible honey comb structural material via a vinyl acetate adhesive, each noncombustible plate being made from a slurry mainly composed of a sepiolite.

According to another preferred mode, a noncombustible board comprises a noncombustible honey comb structural material including: a plurality of noncombustible sheets piled up on each other in a honey comb structure, each laminated sheet being made from a slurry mainly composed of sepiolite, a vinyl acetate adhesive coated between and joining the noncombustible sheets, and an inorganic impregnant coated on a whole surface of the noncombustible sheets in the honey comb structure; and a pair of noncombustible plate stuck on opposite surfaces of the noncombustible honey comb structural material via a vinyl acetate adhesive, each noncombustible plate being made from a slurry mainly composed of a sepiolite.

According to another preferred mode, a noncombustible molded product is produced by dipping a die formed of a wire cloth into a slurry mainly composed of a sepiolite, making a paper layer on the wire cloth by sucking, and releasing, dehydrating and drying the paper layer.

According to another preferred mode, a method of manufacturing a noncombustible molded product comprises a paper stock preparing step for preparing a slurry mainly composed of a sepiolite; a molding step for dipping a die formed of a wire cloth into the slurry, and making a paper layer on the wire cloth by sucking; and a drying step for dehydrating and drying the paper layer after releasing the paper layer from the wire cloth.

Other objects and advantages of the present invention will become apparent from the detailed description to follow taken in conjunction with the appended claims.

BRIEF DESCRIPTION OF THE DRAWINGS

FIG. 2 is a table showing a variation of a freeness of the first embodiment of the noncombustible sheet according to an amount of PAA.

FIG. 3 is a table showing a variation of a freeness of the first embodiment of the noncombustible sheet according to an amount of paper strength increasing agent.

FIG. 4 is a table showing a tendancy of a physical property of the first embodiment of the noncombustible sheet according to an amount of EPA.

FIG. 5 is a table comparing an noncombustible ductility of the first embodiment of the noncombustible sheet and a noncombustible sheet on sale.

FIG. 12 is an explanatory drawing showing a manufaturing steps of the fourth embodiment of the noncombustible laminated sheet of the invention.

FIG. 15 is an explanatory drawing showing a manufaturing steps of the fifth embodiment of the noncombustible laminated sheet of the invention.

DETAILED DESCRIPTION OF THE PREFERRED EMBODIMENTS

First Embodiment

Figure 1:
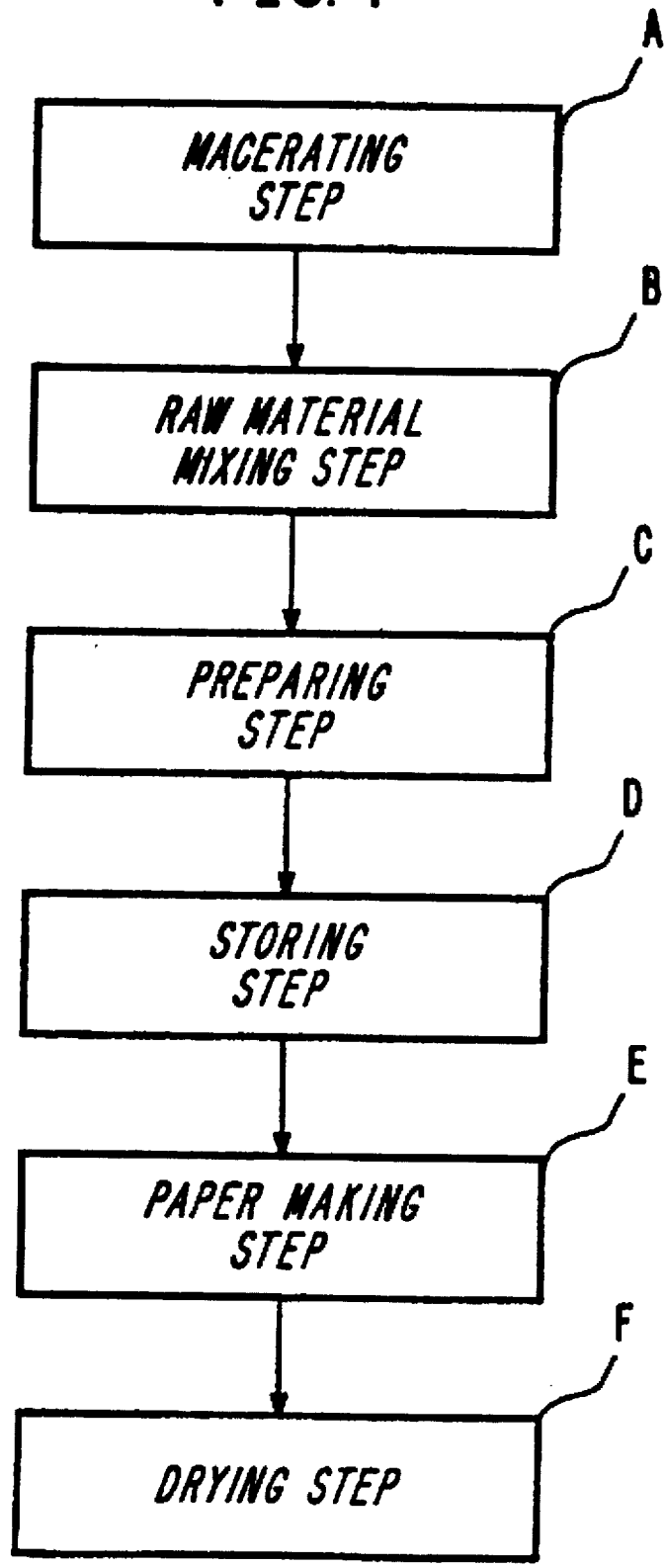
FIG. 1 is a flow chart showing an outline of manufacturing steps of a first embodiment of a noncombustible sheet of the invention.

Referring to FIG. 1 to FIG. 5, wherein like reference characters designate like or corresponding parts throughout the several views, a first preferred embodiment of the invention will be described hereafter.

FIG. 1 is a flow chart showing an outline of manufacturing steps of the first embodiment of a noncombustible sheet.

The present embodiment contains a sepiolite in 80% or more in order to make the most of its character. A binder and the like are added thereto to prepare a slurry, thereafter making paper. Generally, if the sepiolite is rich, freeness is poor in making paper, so that a desired thickness of paper cannot be obtained. Particularly, in case of using a paper machine, paper of a basis weight of 200 g/m² or more is not of practical use in terms of a paper making speed. On the other hand, thin paper of about 100 g/m² has little wet-web strength, so there are problems in its subsequent manufacturing, e.g. in sqeezing or conveying.

In order to overcome these problems, the inventors carried out research and development in preparation of paper stock, freeness, improving treatment, choice of proper binder, devising and improving of a suitable apparatus, etc.

First described are manufacturing steps of the present embodiment of the noncombustible sheet.

In the figures, in a fiber macerating step A, put in a macerator are a sepiolite as a main material, a glass fiber as a reinforcer and a wood pulp and a synthetic fiber as a reinforcing fiber. Next, they are separated by stirring to better dispersion of the fibers. Here, in this embodiment, an amount of the wood pulp is retained at not more than 5% by weight, because there is an obstruction to imcombustibility if the amount is more than 5% by weight.

Next, in a raw material mixing step B, put in a mixing tank are the macerated sepiolite, a first binder, a second binder, a softener, a stabilizer, etc. They are mixed therein to prepare a slurry. The first binder used herein is a thermoplastic resin of PAA (polyacrylamide) of molecular weight of 800,000 to 1,000,000 for increasing paper strength. The second binder is a thermosetting resin having a network of three dimensional structure in order to give flocculation and water resistance. EPA (polyamide-polyamine-epichlorohydrine) is used herein.

With respect to the order of addition of the binders, it is preferable to add the first binder to begin with and the second binder next. However, it is possible to make paper, too, by mixing the second binder first and the first binder thereafter.

The slurry mixed in the mixing step B is focused or flocced by a paper stock focusing device in a treating step C.

In focusing, an anion PAA of a molecular weight of 8,000,000 to 10,000,000 was added in order to hasten the fixation of the first and second binders to the slurry as well as to improve the freeness in paper making.

The slurry prepared in the treating step C is delivered to a stock tank and enters a storing step D. In the storing step D, the slurry is always kept in its uniform mixing condition so as to prevent a sedimentation, disintegration of the prepared stock or the like.

The slurry kept uniform in the storing step D is pumped up to a quantity measuring hopper by a quantity measuring pump. The slurry measured by the hopper is conducted to a paper making step E.

In the paper making step E of the present embodiment, a short wire cloth type paper machine was used for making paper. A concentration of a slurry therein was 0.5 to 1.0%, and wire cloth of 50 to 80 meshes was used. In the paper making step E, the above mentioned dispersed aqueous solution with agglutinated floccs formed is poured from an upperside into a paper making tool of a wire cloth of about 80 meshes. Then water therein is rapidly dropped down from the wire cloth via the floccs so as to make a paper layer.

Thereafter, in a drying step F, the paper layer is dehydrated by a press and dried for a prescribed period of time at an atomosphere temperature of about 120 degrees centigrade. Thus the paper layer has its interior moisture evaporated and agglutination of the binder is hastened, thereby drying and solidifying the paper layer into a sheet. The dried sheet is peeled off from a dryer surface of a steam rotary dryer and formed into a paper roll.

By the above steps, a noncombustible sheet of a thickness of 0.1 to 1.0 mm is obtained. The noncombustible sheet has high heat resistance, so that is only smolders and becomes sooty when exposed to fire and is able to maintain its fixed shape.

Next described is a flocculation of a slurry for the purpose of improving freeness.

Selected as a flocculant was the above mentioned PAA which is bonded with metal ions in a composition of the sepiolite, i.d. calcium ions, magnesium ions or cation substances, and which is flocced and bound with fibers. It is guessed that, in the bind of the sepiolite and the PAA, the magnesium ions of the sepiolite and amide groups of the PAA repel each other to form a bridge structure extending in a manner of a normal chain.

In the present research and development, a mixing ratio of the PAA was exmined first time.

A processing condition is as follows. A paper making tool of a size 150 mm square and a wire cloth of 80 meshes were used. A raw material includes a sepiolite of 80% by weight and glass fibers of 15% by weight added thereto as a reinforcer. Twenty-five grams of the material was macerated and dispersed in 100 milliliter of water. A cation EPA (polyamide-polyamine-epichlorohydrine) was added in 2.0% by weight to a solid content of each sample of slurry as a fixed condition. Then the mixing ratio of the PAA was changed as shown in FIG. 2. The sample was diluted in 25 g/1000 ml as a paper making concentration. Thereafter, freeness was judged by measuring a filtrating time of the diluted solution of 1000 ml.

The result was shown in FIG. 2, which indicates a variation of freeness of the first embodiment of the noncombustible sheet according to an amount of PAA. The sample with 0.3% by weight of PAA has good freeness, but, since volume of a floc is large, paper therefrom is bad in formation. Therefore, it is better to add the PAA in the amount of approximately 0.2% by weight.

Next described is a relation between an addition of a paper strength increasing agent and a freeness.

The first binder of the anion PAA of a molecular weight of 800,000 to 1,000,000 was selected as the paper strength increasing agent as described above.

As a fixed condition, the PAA for flocculation is added in 0.2% by weight for a better freeness as mentioned in the above examination, while the EPA is added in 2.0% by weight as the above. A processing condition is the same as the above.

The result is shown in FIG. 3. FIG. 3 is a table showing a variation of a freeness of the first embodiment of the noncombustible sheet according to an amount of paper strength increasing agent.

The sampled PAA for increasing the paper strength has high viscosity. So the floccs are geled and the freeness is not good in the amount of No. 4 or more. Therefore, 1.0 to 2.0% by weigh PAA is preferable.

Next examined is a tendency of physical character according to a change of the EPA (thermosetting resin).

As a fixed condition, the PAA (for flocculation) is 0.2% by weight and the PAA for increasing the paper strength is 2.0% by weight. The processing condition was the same as the above.

The result is shown in FIG. 4. FIG. 4 is a table showing a tendency of a physical property of the first embodiment of the noncombustible sheet according to an amount of EPA.

A wet tensile strength is the highest in the case of No. 5, so 2% by weight of the EPA is preferred. If the amount exceeds 2.0% by weight, organic component becomes large against the purpose of incombustibility, so 2.0% by weight is made the upper limit.

Here, in the present examination, a glass fiber is added as a reinforcer in order to improve more the paper strength.

A mixing ratio relative to the sepiolite and fiber length of the glass fiber were changed, and strength and freeness were examined. More in detail, the fiber length was set in 3 mm, 6 mm, or 13 mm, and the mixing ratio was changed into 5%, 10%, 15%, 20% by weight, respectively to the fiber length.

As a result, the glass fiber of the length of 13 mm and mixing ratio of 15% to 20% by weight was the best in terms of the strength and the freeness compared totally with others. It is thought that the glass fiber has a function to hasten the flocculation as a filler.

A case is shown in FIG. 5 in which a comparation was carried out between the sample No. 4 of FIG. 4 of the invention and a sample on sale (aluminium hydroxide paper made of wood pulp and aluminium hydroxide powder) with respect to water resistance.

FIG. 5 is a table comparing an underwater ductility of the first embodiment of the noncombustible sheet and a noncombustible sheet on sale.

There is no difference of the underwater ductility between the sample of the invention and that on sale either in one hour dipping and twenty-four hours dipping in a machine direction. However, the ductility of the sample of the invention is obviously small in a cross direction. Thus the sample of the invention shows excellent water resistance as a whole.

The reason why the ductility of the sample on sale is remarkably different between the machine direction and the cross direction is guessed as follows. Namely, fibers of the wood pulp are easy to be oriented in the machine direction in paper making. Thus degree of entangled fibers is made large, so that the elongation is made small. On the other hand, degree of entangled fibers is made small in the cross direction, so that the elongation is made large.

On the other hand, to our supposing, the sample of the invention does not use wood pulp, but is mainly composed of the sepiolite, so that the fiber length is comparatively small, thus making small an inclination to be oriented in a certain direction of the fibers. Moreover, the fine glass fibers form integral bundle of fibers, so that differences of the ductility are made small between the machine direction and cross direction.

As mentioned above, the noncombustible sheet of the first embodiment is obtained by making paper from the slurry consisting essentially of the sepiolite as the main material, the glass fiber as the inorganic fiber for reinforcement, the first binder of PAA (polyacrylamide) as the thermoplastic resin, and the second binder of EPA (polyamide-polyamine-epichlorohydrine) as the thermosetting resin.

According to the first embodiment, the paper made from the sepiolite added with the first and second binders is noncombustible since the main material is the sepiolite which is the inorganic fiber. The first binder of PAA contributes to the fixing ability and the paper strength can be improved.

Moreover, the second binder of EPA as thermosetting resin is stable to the water, since it is a high molecular compound with a network of three dimensional structure and atoms thereof are bound by strong covalent bonds. Thus it can give the paper water resistance. Further, it improves the freeness in paper making thereby making it easy to form the sheet.

Moreover, the glass fiber mixed as reinforcer can improve more the physical property relating to the strength.

Popular material is used as the raw material and the binder, so that the sheet can be produced at low costs.

Next, a modification of the first embodiment will be described.

In this modification, the cation thermoplastic resin is added to the first binder, the second binder and the PAA as the anion thermoplastic resin for flocculation, while the PAA (molecular weight of 8,000,000 to 10,000,000) for flocculation is used as the third binder, and the cation thermoplastic resing is used as the fourth binder.

The third and fourth binders act as flocculants. Then, they make rough and large the floccs which are fixed and flocced by the addition of the first and second binders in the first embodiment. Thus the paper making ability can be improved. Namely, in the raw material mixing step B, the first and second binders are added as in the first embodiment. Thereafter the third binder of the anion thermoplastic resin is mixed in the treating step C to the slurry that is made cation side so as to enlarge and roughen the floccs. Then the fourth binder of the cation flocculant is added to make hydrophobic floccs. Thus strong and rigid floccs can be formed.

For example, AA (acrylic amide and acrylic acid copolymer) may be available as the third binder, other than the PAA for flocculation. For the fourth binder, DMAEM (dimethylaminoethylmethacrylate) may be available.

Regarding the mixing ratio of the binders, preferably, the first binder is not more than 2% by weight, the second binder is not more than 2% by weight, the third binder and the fourth binder is 0.2 to 1.0% by weight in total, to a solid content of the slurry, while the ratio of the third binder is 25 to 75% in the third and fourth binders.

In the present modification, it is preferable to add the first binder, to begin with, and the second binder next, with respect to their order. However, a reverse order may be available. Moreover, it is also preferable to add the third binder first, with respect to the addition order of the third and fourth binders. However, it is possible to make paper with a reverse order.

Second Embodiment

Next, a second embodiment of the invention will be described.

Hereunder shown in Table 1 is a composition of a raw material of the present embodiment.

TABLE 1

| COMPONENT | | COMPOUNDING RATIO (% BY WEIGHT) |
|---|---|---|
| MAIN MATERIAL | SEPIOLITE | 80 |
| REINFORCER | GLASS FIBER | 10 |
| AUXILIARY FIBER | WOOD PULP | 4.7 |
| AUXILIARY FIBER | SYNTHETIC FIBER | 4.7 |
| FLOCCULANT | STRONG CATION POLYMER (DMAEM) | 0.3 |
| FLOCCULANT | STRONG ANION POLYMER (AA) | 0.3 |

In the Table 1, DMAEM is a dimethylaminoethylmethacrylate (samely referred to hereunder) and AA is an acrylamide-acrylic-acid copolymer (samely referred to hereunder). They are used in the present embodiment respectively as a strong cation polymer and a strong anion polymer.

The present invention is characterized in these flocculants. These polymers are liquid high molecular polymer. The compounding ratio shows a pure percentage of the polymer or a percentage by weight in solid.

Generally, there are no strict definitions of the "strong cation polymer" and the "strong anion polymer". In the present invention, the "strong cation polymer" means the one with more than 3.5 meq/g cations. The "strong anion polymer" means the one which 20% or more is disaggregated into anions or which less than 80% is not disaggregated, by judging ionicity thereof in terms of general uses, since the kinds of the anion type high molecular flocculant are limited.

The compounding ratio of the flocculants will be described later.

In this embodiment, water was added to the raw material of the above compounding ratio to dilute it into 0.5 to 1.0% solution, that is a concentration for making paper.

The noncombustible sheet of the above composition is manufactured in the same manner as that of the first embodiment shown in FIG. 1, except it uses the strong cation polymer and the strong anion polymer at the same time as the flocculant that is used in the preparing step C.

Next described are the flocculants in that the present embodiment is characterized.

Generally, in case a raw material is wood pulp, synthetic fibers, inorganic fibers and the like with good freeness, the flocculant is added to the raw material in an amount of 0.01 to 0.1% by weight to a solid content of the raw material. Thereby, electrical fixation is conducted to form floccs, thereby being able to mass-produce the paper.

However, in case the raw material is a sepiolite, as mentioned above, freeness is bad and tearing strength is poor, so that it cannot endure mechanical shocks like pumping up, stirring, turbulent flow, etc. Accordingly, mass-production was difficult in the conventional arts.

In the present invention, the strong cation polymer and the strong anion polymer are used in predetermined compound ratios, so that ionic complex is produced with the prepared slurry comprised of the sepiolite as main material. Thereby, the sepiolite is made insoluble to form networks, so that paper making on mass-production basis has been made possible.

The details will be explained hereunder on the basis of experimental data shown in FIG. 6 to FIG. 8.

Figure 6:
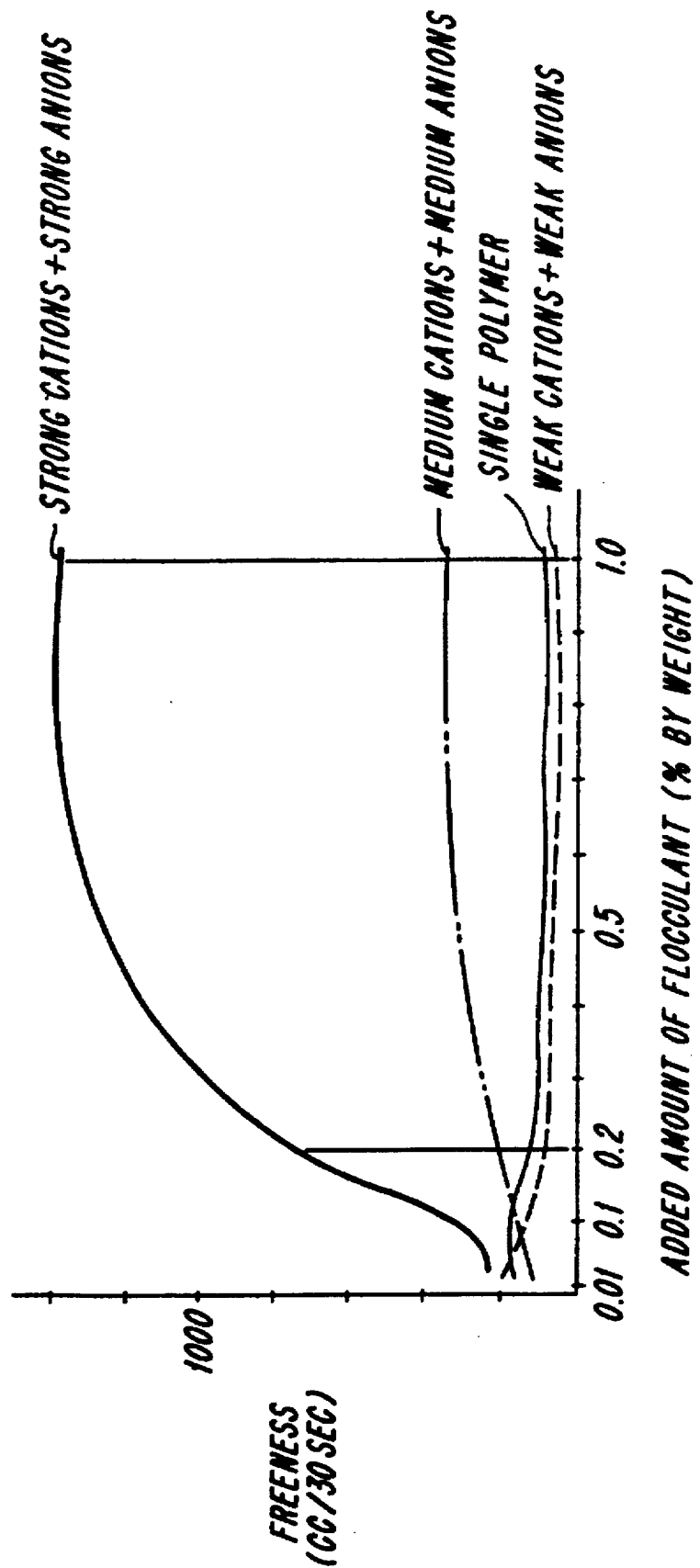
FIG. 6 is a graph showing a relation between an amount of added flocculant and freeness in a second embodiment of the invention.

FIG. 6 is a graph show showing a relation between an amount of added flocculant and freeness in a second embodiment of the invention. FIG. 7 is a characteristic graph showing a relation between an amount of added flocculant and turbidity in the second embodiment of the invention. FIG. 8 is a characteristic graph showing a relation between a combined ratio of flocculating polymers and freeness in the second embodiment of the invention.

Shown in FIG. 5 is examined freeness which is to be an index of productivity in case of changing an added amount of every kinds of flocculants. The freeness was evaluated by pouring diluted paper stock of 1,000 cc into a cylindrical container with a wire gauze of 80 mesh set therein, and measuring filtrating amount of the slurry in thirty seconds.

In the figures, thin solid lines show typically the case of using "single" flocculant such as nonions of high molecular polymer, "strong cations", "medium cations", "weak cations", "strong anions", "medium anions", "weak anions", etc. Each of the flocculants showed curves approximate to the thin solid lines represented in the characteristic drawing.

On the other hand, in case of combining the cations and the anions of the high molecular polymers, the one which combines the "weak cations" and the "weak anions" shows curves shown by the broken line, that is substantially similar to the case of the "single" flocculant. The combination of the "medium cations" and the "medium anions" shown slightly larger value of freeness. However, it is hard to industrially manufacture the sheet with the freeness of the "medium cations" and "medium anions". Here, the values of the added amount show the total amount of both the cations and anions (samely shown hereunder).

To the contrary, the combination of the "strong cations" and the "strong anions" shows at its peak a freeness about four times that of the combination of the "medium ones". This value or around can be deemed as an enough level for mass-production. From the curve of the figure, it is thought to be available for mass-production if it is more than 0.2% by weight or its vicinity. But it is hard to make paper with more than 1.0% by weight, since the viscocity of the slurry is very large. Therefore, it is judged that 0.2 to 1.0% by weight is the addition amount for enabling mass-production.

On the other hand, also examined was turbidity after filtration that can be used as an index for paper-making ability and that is consistent with the freeness. The turbidity was measured by use of a filtrated slurry by a photoelectric turbidimeter on scattered or reflected light.

Figure 7:
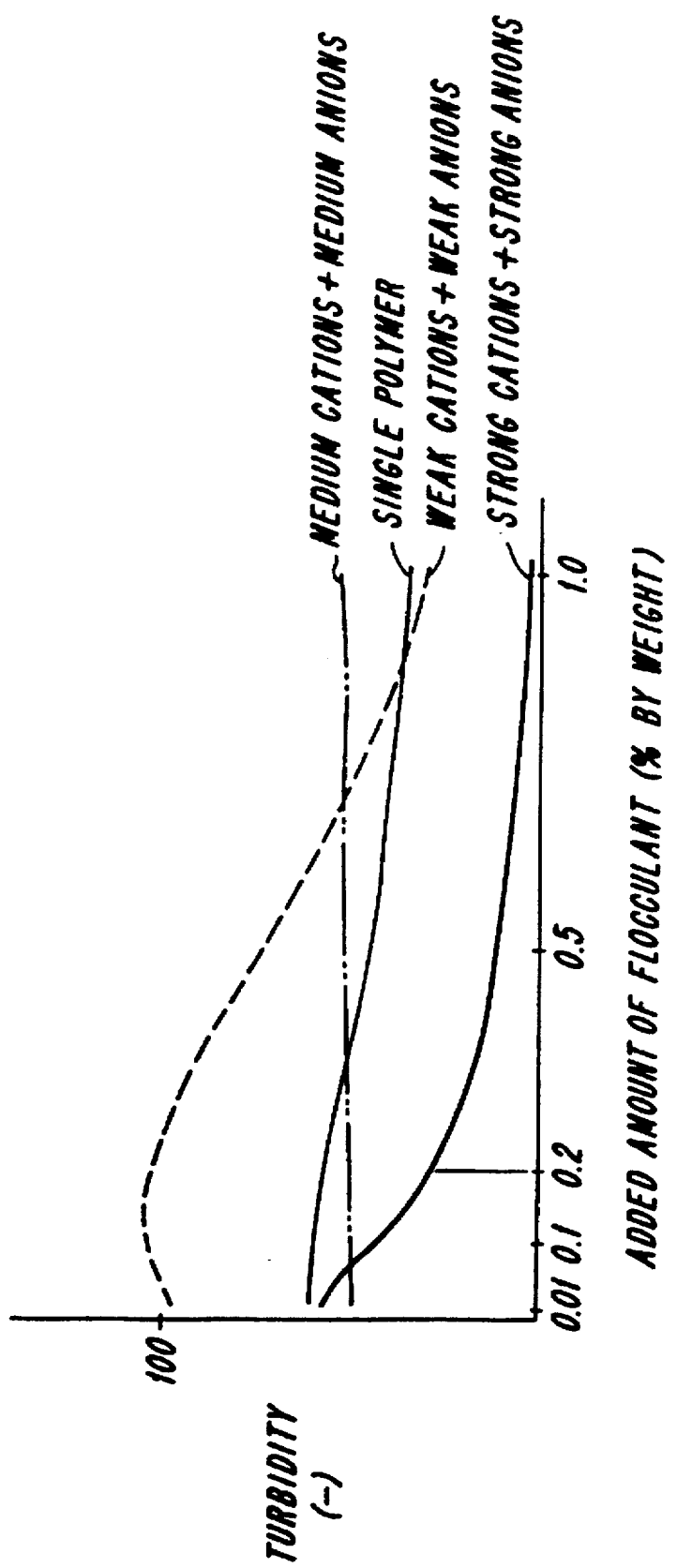
FIG. 7 is a characteristic graph showing a relation between an amount of added flocculant and turbidity in the second embodiment of the invention.

In FIG. 7, a large freeness means a good filtrability of a wire cloth, wherein the turbidity of the filtrated slurry indicates of course a low value. As obvious from the figure, it is understood that the combination of the "strong cations" and the "strong anions" show a very low value compared with the "single" polymer, the combinations of "weak cations and anions", "medium cations and anions", which are the same as those of FIG. 6.

As mentioned above, the combination of the "strong cations and anions" is good in paper making performance. This will be because the strong cation polymer and the strong anion polymer form ion complex with the prepared slurry of the sepiolite as the main material. So it is made insoluble to decrease adhered water, so that hydrophilic property is lowered to tighten the floccs. Here, it is understood that the effects of combination do not come out in the case of the combinations of "weak cations and anions" and "medium cations and anions".

Next described is a combined ratio of the strong cation polymer and the strong anion polymer in the case of the "strong cations and strong anions".

Figure 8:
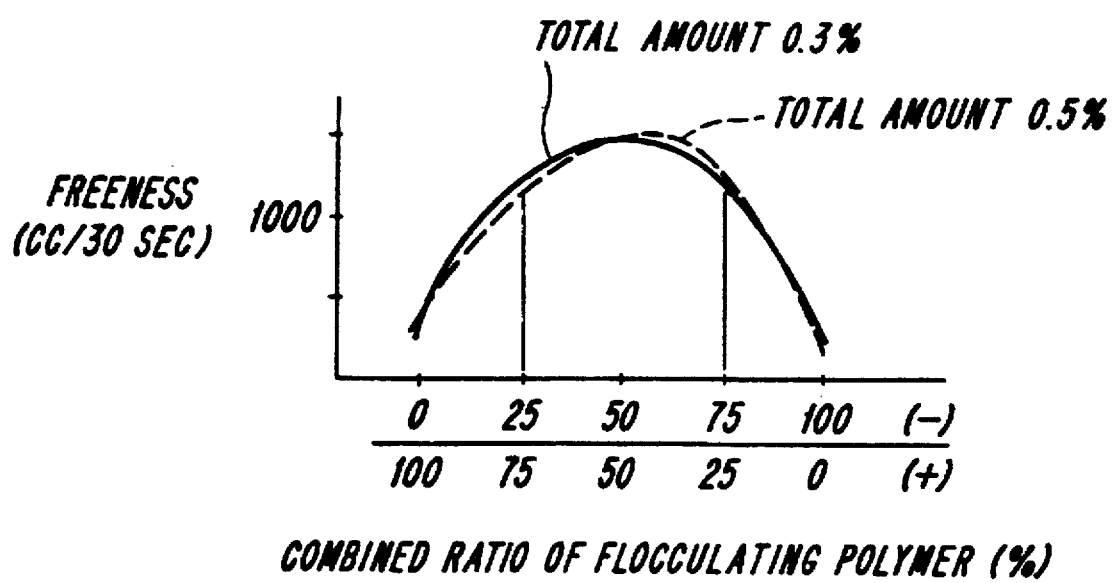
FIG. 8 is a characteristic graph showing a relation between a combined ratio of flocculating polymers and freeness in the second embodiment of the invention.

FIG. 8 shows a combined ratio of each polymer in flocculants that combine the strong cation polymer and the strong anion polymer. Percentage of formation of ion complex and freeness therein were the largest when the combined ratio of strong cation polymer and the strong anion polymer is 50%, namely when a mole ratio thereof is 1:1, either in case a total added amount of the "strong cations and strong anions" is 0.3% by weight and 0.5% by weight. This is because, to out understanding, the strong cation polymer and the strong anion polymer carry out a equimolar reaction theoretically. Here, it is judged from the figure that mass production will be possible with the mixing mole ratio of the strong cation polymer in the range of about 25 to 75%.

As mentioned above, the noncombustible sheet of the present embodiment is obtained by making paper from the slurry in which the sepiolite as main material is added with a total amount of 0.2 to 1.0% by weight of the high molecular flocculant of DMAEM of the strong cation polymer and AA of the strong anion polymer reltaive to a solid content of the raw material.

According to the above embodiment, the flocculant combining the strong cation polymer and the strong anion polymer forms ion complex with the prepared slurry of the sepiolite as the main material. Thereby they are made insoluble and adhered water is decreased and hydrophylic property is lowered and floccs are tightened. As a result, there are formed floccs that are strong enough to bear mechanical shocks such as pumping-up, stirring and turbulent flow and that are of high yield. Thus their paper making performance are improved and it is made possible to mass-produce noncombustible sheets from the sepiolite as the main material.

In this case, the combination effects of the strong cation polymer and the strong anion polymer are low with the total added amount of not more than 0.2% by weight to a solid content of the raw material. It is difficult to make paper because of high viscosity of paper stock water, with the total added amount of not less than 1.0% by weight thereof. Therefore, the above floccing of high yield can be achieved with the total added amount of 0.2 to 1.0% by weight.

The mole ratio of the cation polymer is made 25 to 75% in the high molecular flocculant with the combination of the strong cation polymer and the strong anion polymer. Thus the formation percentage of the ion complex is made high and the freeness can be enlarged, so that the floccing of high yield can be achieved like the above.

The noncombustible sheet manufactured as above is incombustible and water resistant and can be manufactured at low costs, since the raw material is the sepiolite of low price.

The strong cation polymer and the strong anion polymer in the second embodiment correspond to the third binder and the fourth binder in the first embodiment. The second embodiment show that paper making is possible only by use of these binders. However, it is possible to add thereto the first binder and the second binder of the first embodiment so as to improve the paper making ability. This case corresponds to the first embodiment.

Third Embodiment

Next, a third embodiment of the invention will be described referring to the drainwgs.

Figure 9:
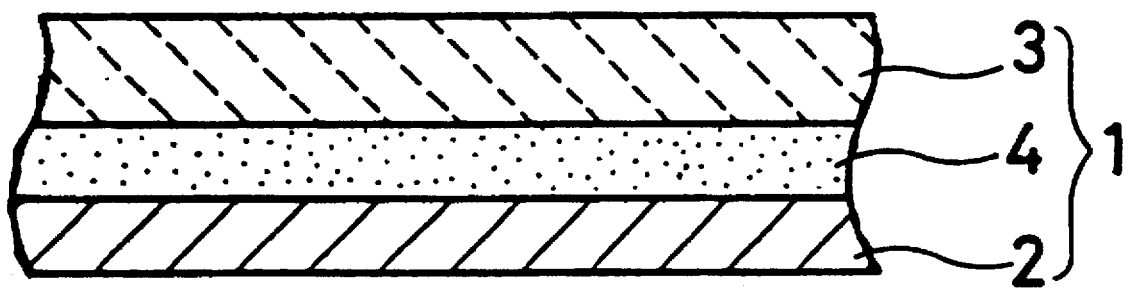
FIG. 9 is a sectional view of a third embodiment of a noncombustible laminated sheet of the invention.

FIG. 9 is a sectional view of a third embodiment of a noncombustible laminated sheet of the invention.

In the figure, a laminated sheet 1 is made by laminating and joining an aluminium foil 2 of a thickness of about 20 to 100 micrometer and a noncombustible sheet 3 of a paper thickness of about 0.1 to 1.0 mm via an inorganic adhesive 4. The noncombustible sheet 3 is a paper having incombustibility made from a sepiolite as a main material which is manufactured by a method described later. On the other hand, as the inorganic adhesive 4, a water soluble type or a water dispersion type is used. For example, a variety of inorganic agents having heat resistance may be used such as an adhesive which synthesizes a potassium silicate and an antimony pentoxide.

Figure 10:
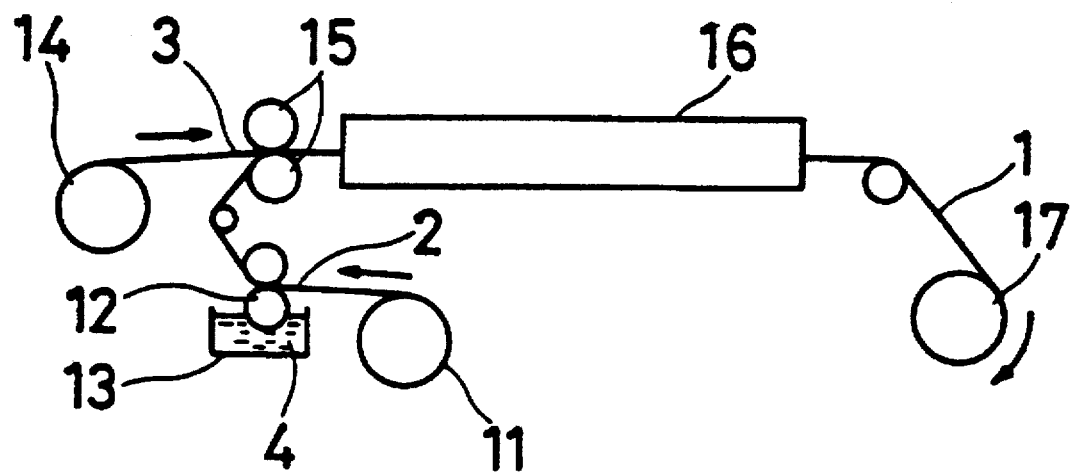
FIG. 10 is a schematic process drawing showing a manufatcuring method of the third embodiment of the noncombustible laminated sheet of the invention.

A manufacturing method of the above structured laminated sheet is shown in FIG. 10.

FIG. 10 is a schematic process drawing showing a manufatcuring·method of the third embodiment of the noncombustible laminated sheet of the invention.

The figure illustrates a manufacturing method called a "wet lamination". An aluminum foil feeding bobbin feeds the aluminium foil 2 to a pressing and joining section. A coating roller 12 coats one surface of the aluminium foil 2 delivered from the feeding bobbin 11 with the inorganic adhesive 4 in an adhesive tank 13. A noncombustible sheet feeding bobbin 14 feeds the noncombustible sheet 3 to the pressing and joining section. A vertical pair of rollers 15 press and join the aluminium foil 2 and the noncombustible sheet 3, that are delivered from the bobbins 11 and 14. A drying furnace 16 drys and solidifies the laminated sheet 1, and a winder bobbin 17 winds the laminated sheet 1.

For manufacturing the laminated sheet 1 by the above apparatus, first of all, the aluminium foil 2 is taken out from the feeding bobbin 11 in a feeding step. Next, in a coating step, the inorganic adhesive 4 in the tank 13 is coated on one whole surface of the aluminium foil 2 in a uniform thickness during it passes the coating roller 12. The aluminium foil 2 with the inorganic adhesive 4 coated is delivered to the press roller 15 while maintaining its wet condition, since the inorganic adhesive 4 is a water soluble type or a water dispersion type. At the same time, the noncombustible sheet 3 is fed out of the feeding bobbin 14 in synchronization with the feeding speed of the aluminium foil 2 from the feeding bobbin 11.

Next, in a joining step, the aluminium foil 2 and the noncombustible sheet 3 from the bobbins 11, 14 are inserted between the pair of rollers 15 to pressingly sandwitch them in a body, thereby making them laminated. Thereafter, the laminated aluminium foil 2 and noncombustible sheet 3 is led into the drying furnace 16 and heated a fixed time at a fixed temperature. Thus interior moisture thereof is evaporated from between particles of the noncombustible sheet 3 and the sheet is dried and solidified. After going out of the drying furnace 16, the solidified sheet is cooled and cut in a predetermined width and wound around the winder bobbin 17.

According to the above steps, there is finished making of the laminated sheet 1 with the aluminium foil 2 and the noncombustible sheet 3 piled up via the inorganic adhesive 4.

The laminated sheet 1 can be used alone in its planar shape or for a building material or the like after being adhered to a heat insulating material like glass wool and rock wool.

The laminated sheet 1 is also capable of being used alone after being formed with concavo-convex shape by embossing or corrugating processing.

The embossing can be carried out by a know method or by a press via an engraving roller.

Here, when the sheet 21 is folded, there take place no ruptures on the sheet 1, which will be caused in case of folding a single aluminium foil 2, since the aluminium foil 2 is retained by the noncombustible sheet 3 that has viscoelasticity.

The noncombustible sheet 3 was manufactured by making paper from a slurry prepared by a sepiolite as a main material and a high molecular binder and a glass fiber added thereto.

The manufacturing steps of the nonocombustible sheet 3 is the same as that of the first embodiment shown in FIG. 1. The noncombustible sheet 3 of a paper thickness of 0.1 to 1.0 mm is finished making through the steps. The noncombustible sheet 3 has a high heat resistance, or it smalders little and becomes only sooty, and is able to hold its fixed shape, if fire is brought near it.

As mentioned above, the laminated sheet of the above third embodiment is composed of the aluminum foil 2, the noncombustible sheet 3 and the inorganic adhesive 4 joining the foil 2 and the sheet 3.

According to the embodiment, the noncombustible sheet 3 holds its shape by its own viscoelasticity when the laminated sheet 1 is processed by folding. Thus the aluminium foil 2 is reinforced by the sheet 3 and the laminated sheet 1 can keep its fixed shape as a whole, though the aluminium foil 2 of the thickness of about 20 micrometers is ruptured conventionally. Therefore, a variety of designs and shapings are available, and it is possible to give decorations to the sheet 1. Further, some physical properties can be obtained such as cushioning effects and heat insulating effects owing to air layers by the irregularity.

Moreover, each of the aluminum foil 2, the noncombustible sheet 3 and the inorganic adhesive 4 is inorganic and noncombustible, so that the sheet 1 can be used in places that may be exposed to fire.

Furthermore, the noncombustible sheet 3 can keep its shape under a high temperature. Thereby the sheet 3 of high heat resistance prevents the aluminium foil 2 from melting and running off under an atmosphere of about 600 degrees centigrade, so that the laminated sheet 1 can hold its shape as a whole. Therefore, condition for a working temperature is made easy or lightened, though a single aluminium sheet 2 can serve only in case of being used under comparatively low temperature.

In addition, the laminated sheet 1 uses the inorganic adhesive 4 having high temperature characteristic, so that there arises no peeling between the aluminium foil 2 and the noncombustible sheet 3 when exposed to a high temperature.

Owing to these properties, the laminated sheet 1 can be used for a variety of structural materials that require heat resistance and noncombustibility such as building materials and internal insulations.

The manufacturing method of the present embodiment has the feeding step for feeding the aluminium foil 2 and the noncombustible sheet 3 to the press roller 15 respectively, the coating step for coating the inorganic adhesive 4 on the aluminium foil 2, the joining step for laminating and pressing and joining the aluminium foil 2 and the noncombustible sheet 3 which are fed after coating of the inorganic adhesive 4.

Accordingly, the laminated sheet 1 can be manufactured at low costs by simple subsequent steps of feeding step and the coating step and the joining step.

Fourth Embodiment

Next, a fourth embodiment of the invention will be described referring to the drawings.

Figures 11A, 11B:
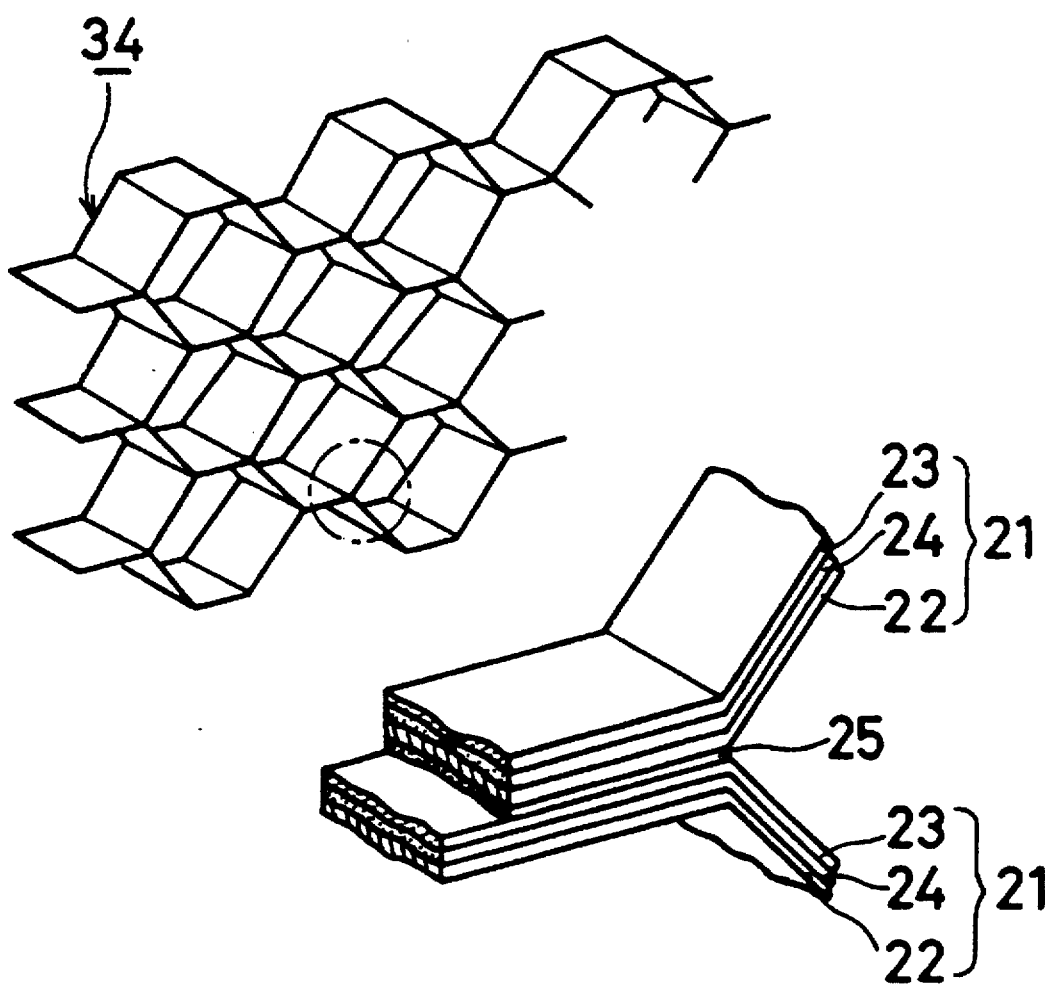
FIG. 11 is a perspective view of a fourth embodiment of a noncombustible honey comb structural material of the invention.

FIG. 11 is a perspective view of a fourth embodiment of a noncombustible honey comb structural material of the invention.

In the figure, a laminated sheet 21 is obtained by laminating and joining an aluminium foil 22 of a film thickness of about 20 to 100 micrometer and a noncombustible sheet 23 of a paper thickness of about 0.1 to 1.0 mm via an inorganic adhesive 24 for forming sheets. The noncombustible sheet 23 is a noncombustible paper made from a sepiolite as a raw material by a manufacturing method described later. On the other hand, as the inorganic adhesive 24, a water soluble type or a water dispersion type is used. For example, a variety of inorganic agents having heat resistance may be used such as an adhesive that synthesizes a potassium silicate and an antimony pentoxide.

A honey comb core 34 of a fixed width composed of a plurality of laminated sheets 21, which are piled up and expanded by use of an inorganic adhesive 25 as inorganic agent for making honey comb. The honey comb making inorganic adhesive 25 is an adhesive of minerals. It is coated in a plurality of lines on a surface of the laminated sheet 21 by a screen transcription. A most suitable material is choosed as the inorganic adhesive 25 in consideration of heat resistance, coating work efficiency, drying speed, adhesive strength, etc. as in the sheet making inorganic adhesive 24.

The above structured laminated sheet 21 is manufactured in the same manner as the third embodiment shown in FIG. 10.

When the sheet 21 is folded, there take place no ruptures on the sheet 21, which will be caused in case of folding a single aluminium foil 22, since the aluminium foil 22 is retained by the noncombustible sheet 23 that has viscoelasticity.

Next described is steps for manufacturing the honey comb core 34 by the laminated sheet 21 made in the above laminating step.

FIG. 12 is a explanatory drawing showing a manufatcuring steps of the fourth embodiment of the noncombustible laminated sheet of the invention.

First, the laminated sheet 21 wound around the winder bobbin 17 as shown in FIG. 12(a) is cut in a fixed width to get a cut sheet 31 as shown in FIG. 12(b). Next, in the coating step, the inorganic adhesive 25 is coated in a plurality of lines of a fixed width, at constant intervals, on a surface of the cut sheet 31 by a screen transcription or a roller coating. Here, if an amount of the inorganic adhesive 24 is much, it flows crosswise and the lines are in disorder. To the contrary, the amount thereof is little, there arise adhesive failures. Therefore, it is necessary to properly select a thickener, meshes of a screen or the like. The inorganic adhesive 25 is coated on other laminated sheets 21 in the same manner. Here, the laminated sheets 21 are vertically piled up on each other so that the lines of the inorganic adhesive 25 are shifted by half pitches one on another. The width of the coating line of the inorganic adhesive 25 is equal to an overlapped width of cells of the honey comb core 24 after manufacturing. Therefore a size of the cell of the honey comb core 34 depends on the coating width of the inorganic adhesive 25.

After the inorganic adhesive 25 is coated at constant intervals, in a laminating and pressing step shown in FIG. 12(c), the laminated sheets 25 are piled up and pressed vertically and joined. Thereby a sheet block 32 is completed while the inorganic adhesive 25 is coated in lines which are shifted in the crosswise direction by half pitches between vertically neighbouring sheets 21.

Thereafter, in a cut step shown in FIG. 12(d), the sheet block 32 is cut into a width of a finished product to get a cut sheet block 33.

In an expanding step shown in FIG. 12(e), the cut sheet block 33 is expanded from its vertically opposite sides to finish making the honey comb core 34.

Here, the noncombustible sheet 23 is manufactured by making paper from a slurry prepared by a sepiolite as a raw material and a high molecular binder and a glass fiber added thereto. The noncombustible sheet 23 of the present embodiment is manufactured in the same manner as each of the above embodiments.

As mentioned above, the noncombustible honey comb structural material of the present embodiment has the honey comb core 34 produced by piling up the laminated sheets 21 in a honey comb manner by use of the inorganic adhesive 25 therebetween, the laminated sheet 21 being composed of the aluminium foil 22 and the noncombustible sheet 23 joined by the inorganic adhesive 24.

According to the present embodiment, the noncombustible sheet 24 can keep its shape under a high temperature. Thereby the sheet 3 of high heat resistance prevents the aluminium foil 22 from melting and running off under an atmosphere of about 600 degrees centigrade, so that the honey comb core 34 can hold its shape as a whole. Therefore, its working temperature can be set higher, though a single aluminium sheet 22 can serve only in case of being used under comparatively low temperature.

Moreover, each of the aluminium foil 2, the noncombustible sheet 3 and the inorganic adhesive 4 is inorganic and noncombustible, so that the sheet 1 can be used in places that may be exposed to fire.

Furthermore, since the noncombustible sheet of low price is used, the aluminium foil 22 can be eliminated by a quantity of the noncombustible sheet 23. Thus the honey comb core 34 is made cheaper compared with an aluminium honey comb core of the same strength which is composed of an aluminium foil 22 alone.

In addition, the honey comb core 34 uses the inorganic adhesive 24 and 25 having a high temperature property, so that there arises no peeling between the aluminium foil 22 and the noncombustible sheet 23 or between the laminated sheets 21 when exposed to a high temperature.

The manufacturing method of the honey comb structural material of the present embodiment has the laminating step for joining the aluminium foil 22 and the noncombustible sheet 23 via the inorganic adhesive 24, the coating step for coating the inorganic adhesive 25 in a plurality of lines of a fixed width on the piled up laminated sheets 21 at constant intervals, the laminating and pressing step for laminating and pressing the cut sheets 31 with the inorganic adhesive 25 coated linearly while the coating positions being shifted alternately by half pitches, the cut step for cutting the sheet blocks 32 obtained in the laminating and pressing step into a fixed width, and the expanding step for expanding the cut sheet blocks 33 in a fixed width to the opposite directions so as to produce the honey comb core 34.

Accordingly, the honey comb core 34 can be manufactured at low costs and with high quality by the above simple sequent steps.

The honey comb core 34 is light weight and of high strength and has properties excellent in noncombustibility, so that it can be widely used for strucural material for air planes or the like, interior panels for railroad vehicles, building materials for interior and exterior walls of buildings, etc.

Figure 13:
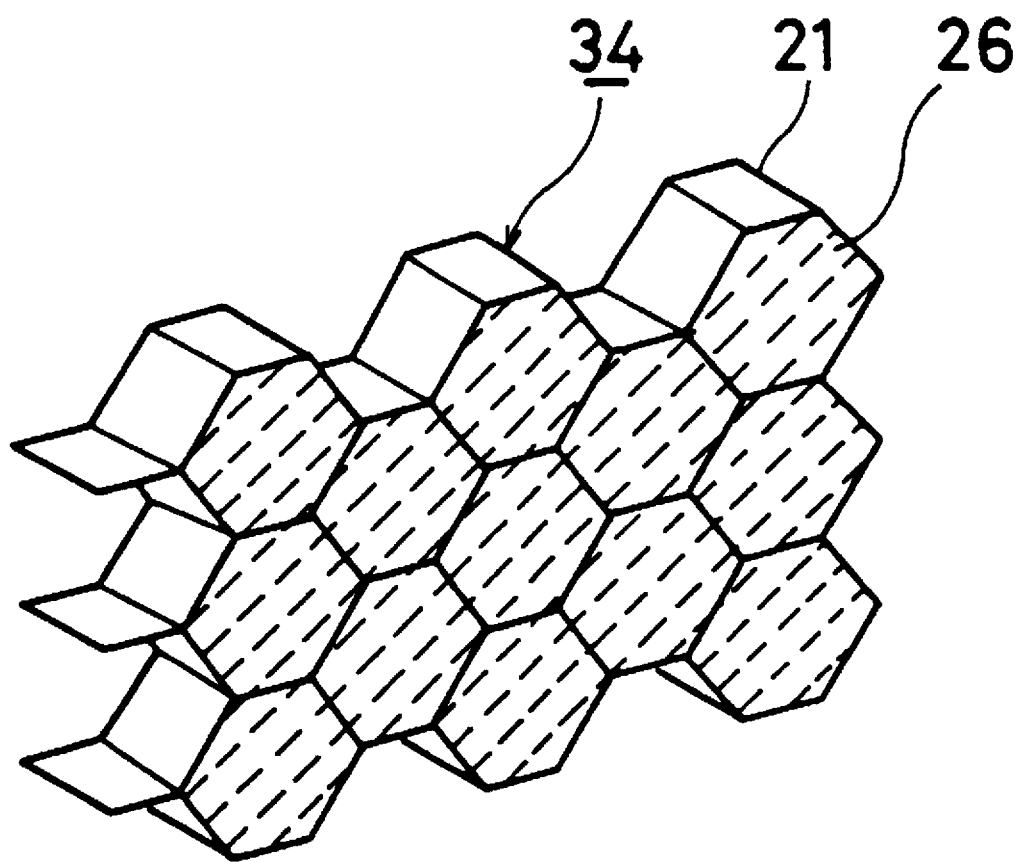
FIG. 13 is a perspective view of another embodiment of a noncombustible honey comb structural material related to the fourth embodiment.

Referring to FIG. 13, next described is another embodiment of a noncombsutible honey comb structural material which relates to the fourth embodiment.

FIG. 13 is a perspective view of another embodiment of a noncombustible honey comb structural material related to the fourth embodiment. In the figure, the same reference numerals as the FIG. 11 and 12 show the same or corresponding elements of the above embodiment.

In the figure, the honey comb core 34 of a fixed width is obtained by piling up and expanding a plurality of laminated sheets 21 by use of the inorganic adhesive 25 in the same manner as the above embodiment. A filler 26 composed of a heat insulating material or the like is filled into cavities of the honey comb core 34.

It is possible to heighten a heat inslulating efficiency of the honey comb core 34 with the filler 26 packed in its cavities, in addition to the properties of the light weight, high strength, heat resistance and noncombustibility, or to give sound absorption thereto, in case the filler 26 is a heat insulating material made of glass wool or rock wool, or made by mixing a foaming agent thereto.

Fifth Embodiment

Next, a fifth embodiment of the invention will be described referring to FIGS. 14 and 15.

Figures 14A, 14B:
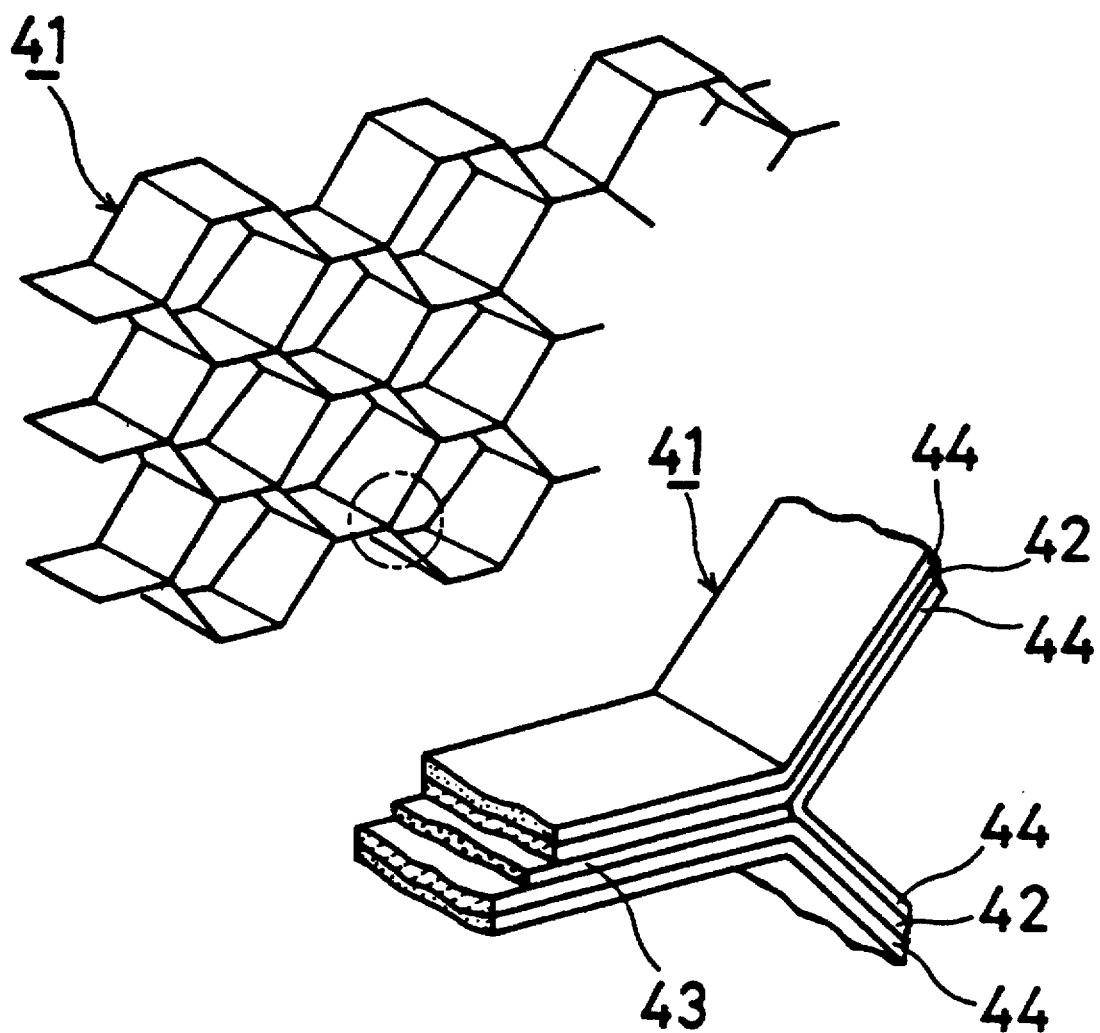
FIG. 14 is a perspective view of a fifth embodiment of a noncombustible honey comb structural material of the invention.

FIG. 14 is a perspective view of a fifth embodiment of a noncombustible honey comb structural material of the invention.

In the figure, a honey comb core 41 of a fixed width is obtained by piling up and expanding a plurality of laminatd sheets 42 made from a sepiolite as a raw material by use of a honey comb making inorganic adhesive 43. As the inorganic adhesive 43, a water soluble type of a water dispersion type is used. A most suitable material therefor is selected in consideration of a heat resistance temperature, coating work efficiency, drying speed, adhesive strength, etc. For example, there may be used ones that mix an aluminium phosphate solution, a colloidal silica, a colloidal alumina or the like with a hardening agent or a catalyst. The present embodiment uses an adhesive with a potassium silicate and an antimony oxide synthesized. An inorganic impregnant 44 is coated on the whole surface of the noncombustible sheet 42 made into a honey comb by a known method like a dipping or a spraying. Every kinds of inorganic adhesives, e.g. a water glass, may be used as this inorganic impregnant 44. Still the water glass or the same material as the inorganic adhesive 43 is preferable.

Next described are steps for making the honey comb core 41 from the noncombustible sheet 42 constructed as above.

FIG. 15 is a explanatory drawing showing a manufatcuring steps of the fifth embodiment of the noncombustible laminated sheet of the invention.

In the same way as the fourth embodiment, first of all, in a cut step shown in FIG. 15(a), the noncombustible sheet 42 is cut in a fixed width. Next, in a coating step shown in FIG. 15(b), the inorganic adhesive 43 is coated in a plurality of lines of a fixed width, at constant intervals, on a surface of the cut sheet 42 by a screen transcription or a roller coating. The inorganic adhesive 25 is coated on other noncombustible sheets 42 in the same manner. Here, with respect to the vertically neighbouring noncombustible sheets 42 that are piled up, the inorganic adhesive 43 is coated at positions shifted alternately by half pitches.

After the inorganic adhesive 25 is coated at constant intervals, in a laminating and pressing step shown in FIG. 15(c), the coated noncombustible sheets 42 are piled up and pressed vertically and joined, thereby making a sheet block 45 with the inorganic adhesive 43 linearly coated at crosswise positions shifted alternately by half pitches.

Thereafter, in a cut step shown in FIG. 15(d), the sheet block 25 is cut into a width of a final product to get a cut sheet block 46.

In an expanding step shown in FIG. 15(e), the cut sheet block 46 is expanded from the opposite sides while dipped into a liquid tank 47 that stores the inorganic impregnant 44. After being taken out of the tank 47, the inorganic impregnant 44 is dried and solidified to finish producing the honey comb core 41.

Here, while the inorganic impregnant 44 is used at the time of expanding work, the sheet block 46 may be first expanded into a honey comb, and be dipped into the liquid tank 47 thereafter to be coated with the impregnant 44. However, work efficiency is better in case the expanding step is carried out at the time of dipping into the tank 47.

The noncombustible sheet 42 constituting the honey comb core 41 is manufactured in the same way as each of the above embodiments.

As mentioned above, the present embodiment of the honey comb core 41 as the honey comb structural material is obtained by piling up the noncombustible sheets 42 into a honey comb structure via the inorganic adhesive 43 therebetween, the sheet 42 being made of a slurry of a sepiolite as a main material, and coating the inorganic impregnant 44 by dipping on it whole surface.

According to the above embodiment, the honey comb core 41 is made of a sepiolite that is flexible. Therefore, the core 41 has a high flexural strength, and it is possible to manufacture the honey comb core 41 by expanding the sheet block 42. The honey comb structural material is never burnt, if exposed to flame, and can keep its fixed shape because of a noncombustible character of the sepiolite that is a mineral fiber. The sepiolite is cheap for a material, so that the honey comb core 41 can be made with low costs. The inorganic adhesive 43 joins the contacted parts thereof, so that the adhesive 43 is never thermally decomposed and that the core 41 is never separated at its contacted parts.

Since the honey comb core 41 has its whole surface coated with the inorganic impregnant 44 after its shaping, its tensile strength and compression strength can be improved. Moreover, its surface strength is heightened due to the coating, so that fuzz or separation of fibers can be prevented.

In this embodiment, it is not always necessary to coat the impregnant 44.

While the fifth embodiment uses the inorganic adhesive 43 as an adhesive coated between the sheets 42 in order to make the honey comb core 41, a vinyl acetate adhesive may alternately be available. In this case, since the vinyl acetate adhesive is organic, the incombustibility of the sheet 42 is made a little poor. However, there are no substantial influences on the incombustibility thereof in the practical use, if an amount of the adhesive is limited to not more than 5% to a total amount of the sheet 42 or if the inorganic impregnant 44 is coated thereon. Moreover, the vinyl acetate adhesive is superior to the inorganic adhesive 43 in the work efficiency of coating and drying. Compared with the conventional aluminum hydroxide paper, the vinyl acetate adhesive has higher permeability to the noncombustible sheet, thereby enlarging the adhesive strength.

Sixth Embodiment

Figure 16:
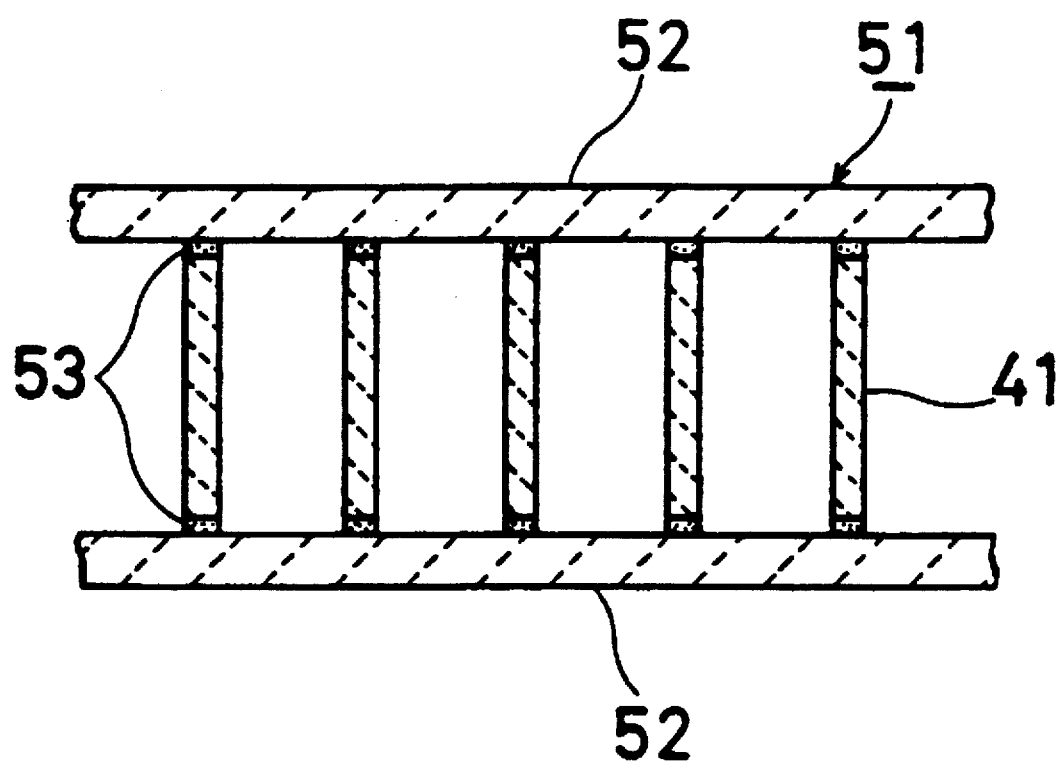
FIG. 16 is a sectional view of a sixth embodiment of a noncombustible board of the invention.

Referring to FIG. 16, next described is a sixth embodiment of a noncombustible board of the invention.

FIG. 16 is a sectional view of a sixth embodiment of a noncombustible board of the invention. In the figure, the same reference numerals as FIGS. 14 and 15 show the same or corresponding elements as the fifth embodiment.

In the figure, the honey comb core 41 of a fixed width is obtained by piling up and expanding the same laminated sheets 42 as the fifth embodiment by use of the honey comb making inorganic adhesive 43 as in the fifth embodiment. The honey comb core 41 is preferably coated with the inorganic impregnant 44 on its whole surface by a certain means like dipping, as in the fifth embodiment.

A noncombustible board 51 is obtained by sticking noncombustible plates 52 on both side surfaces of the honey comb core 41. The noncombustible plate 52 is got by making paper from a slurry of a sepiolite as a main material. The plate 52 is of the same material as the noncombustible sheet 42, and is made rather thicker than the sheet 42. A board making inorganic adhesive 53 is coated on opposite end surfaces of the honey comb core 41 by a method like a roller coating so as to join the honey comb core 41 and the noncombustible plate 52. Every kinds of inorganic adhesives may be used as this inorganic adhesive 53, however, the same material as the honey comb core making inorganic adhesive is preferable.

The above structured noncombsustible board 51 of the sixth embodiment is made from a sepiolite as a main material, so it functions samely as the fifth embodiment. It has the noncombustible plates 52 stuck on the opposite surfaces, so that it has a large strength against a compression load from crosswise direction. In case a surface material like a steel sheet is stuck on the side surface of the noncombustible board 51, since all one surface of the noncombustible plate 52 serves as adhesion surface, adhesion strength can be enlarged compared that the surface material is stuck directly on the honey comb core 41.

The noncombustible board 51 is light weight and of high strength and has excellent properties in heat resistance and noncombustibility. Therefore, it can be widely used for partition wall materials as building materials, core materials for panels such as sliding doors, other type of doors and floors, structural materials for air planes or the like and interior panels of the railroad vehicles or the like, by itself, or by sticking a surface material as a liner such as steel sheet.

Especially, in the partition panels for building materials, the steel sheets as the surface materials, which are stuck on the opposite sides, tend to be thinner recent years. Therefore, there are requirements of improving a strength of a core material as a liner. Thus the noncombustible board 51 has much value as a core material that is useful therefor.

In the sixth embodiment, it is possible to use a vinyl acetate adhesive instead of the inorganic adhesive 43 and 53 as an adhesive used to form the honey comb core 41 and the noncombustible board 51. In this case, since the vinyl acetate adhesive is organic, the incombustibility of the core 41 or board 51 is made a little poor. However, there are no substantial influences on the incombustibility thereof in the practical use, if an amount of the adhesive is limited to not more than 5% to a total amount of the core 41 or board 51 or if the inorganic impregnant 44 is coated thereon. Moreover, the vinyl acetate adhesive is superior to the inorganic adhesive 43 and 53 in the work efficiency of coating and drying.

Seventh Embodiment

Next described are a noncombustible molded product and its manufacturing method which is made from the same composition as that shown in the Table of the second embodiment.

Figure 17:
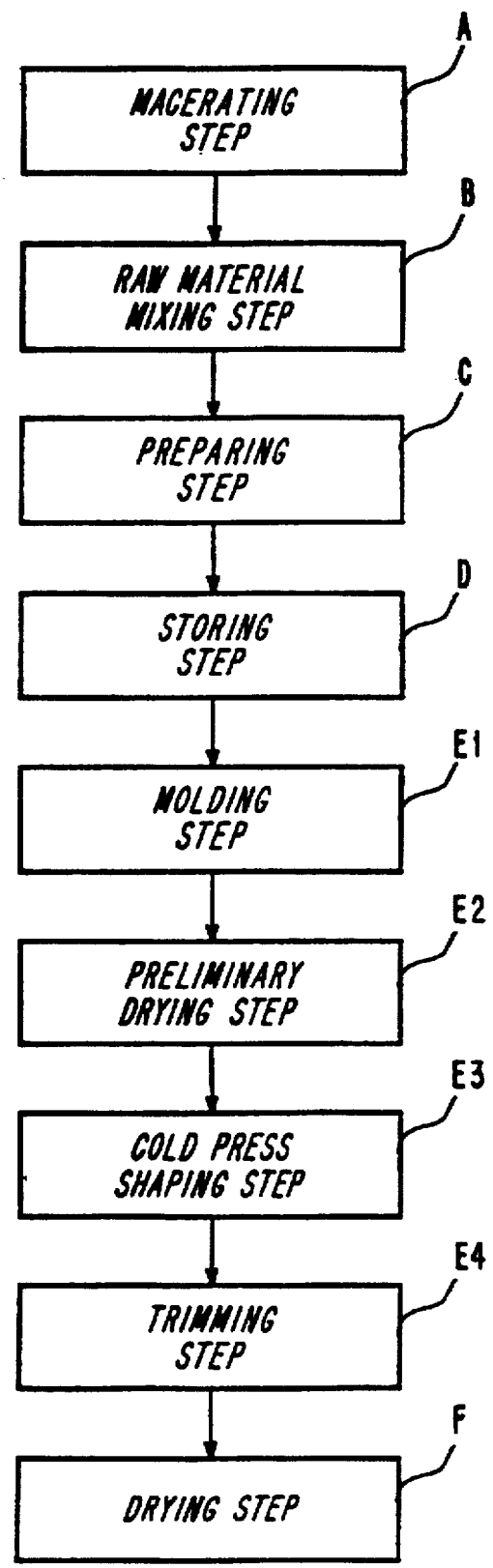
FIG. 17 is a flow chart showing an outline of manufacturing steps of a seventh embodiment of a noncombustible molded product of the invention.

FIG. 17 is a flow chart showing an outline of manufacturing steps of a seventh embodiment of a noncombustible molded product of the invention.

In the figure, every steps from the macerating step A to the storing step D are the same as those of the above embodiments, and constitute a paper stock preparing step.

After a slurry is obtained in this paper stock preparing step, the slurry that keeps its uniform condition is pumped up to a quantity measuring hopper by a quantity measuring pump. The slurry is then led into a molding step E1.

Figure 18:
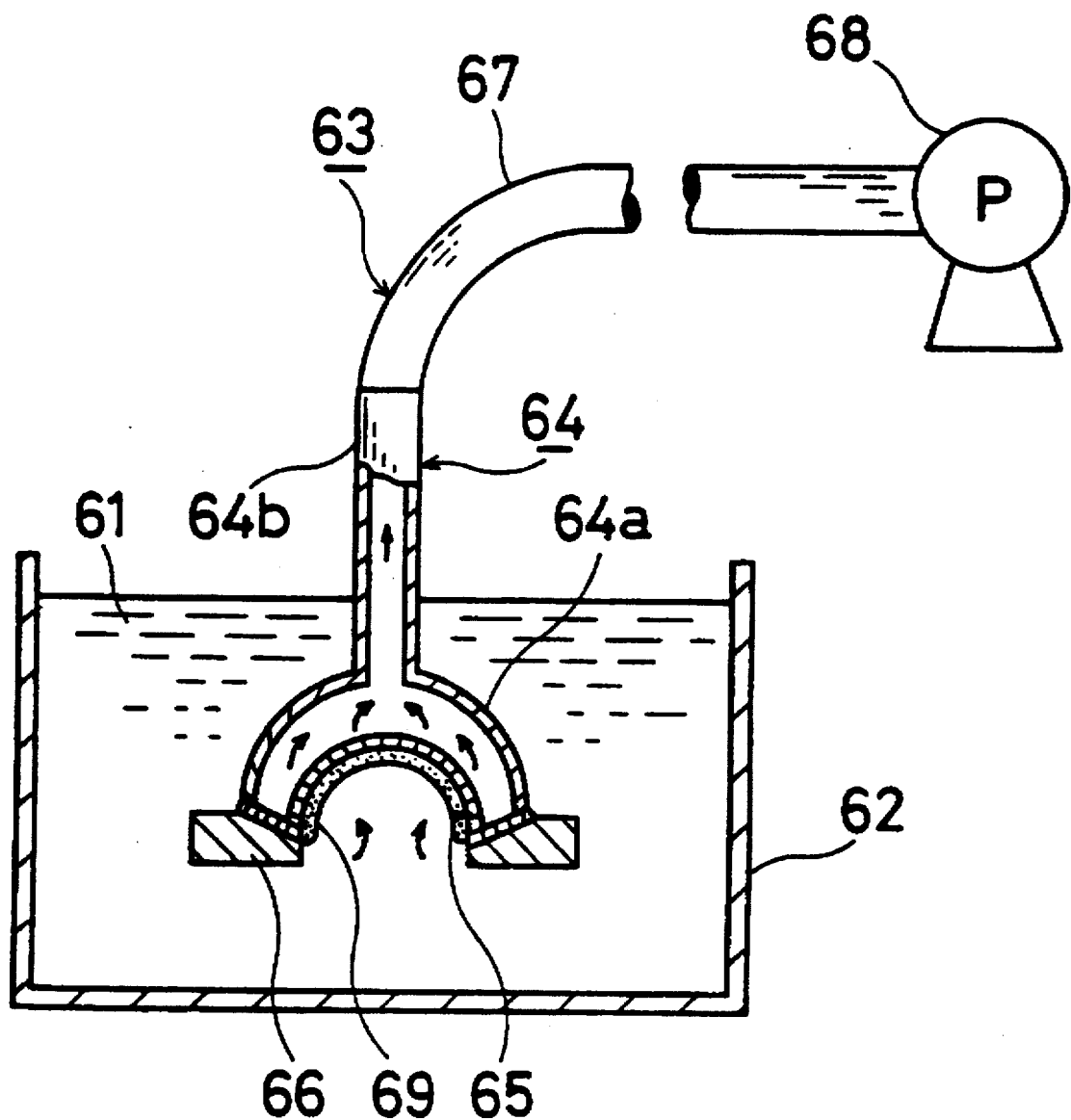
FIG. 18 is a schematic view showing a molding apparatus of the seventh embodiment of the noncombustible molded product of the invention.
Figure 19:
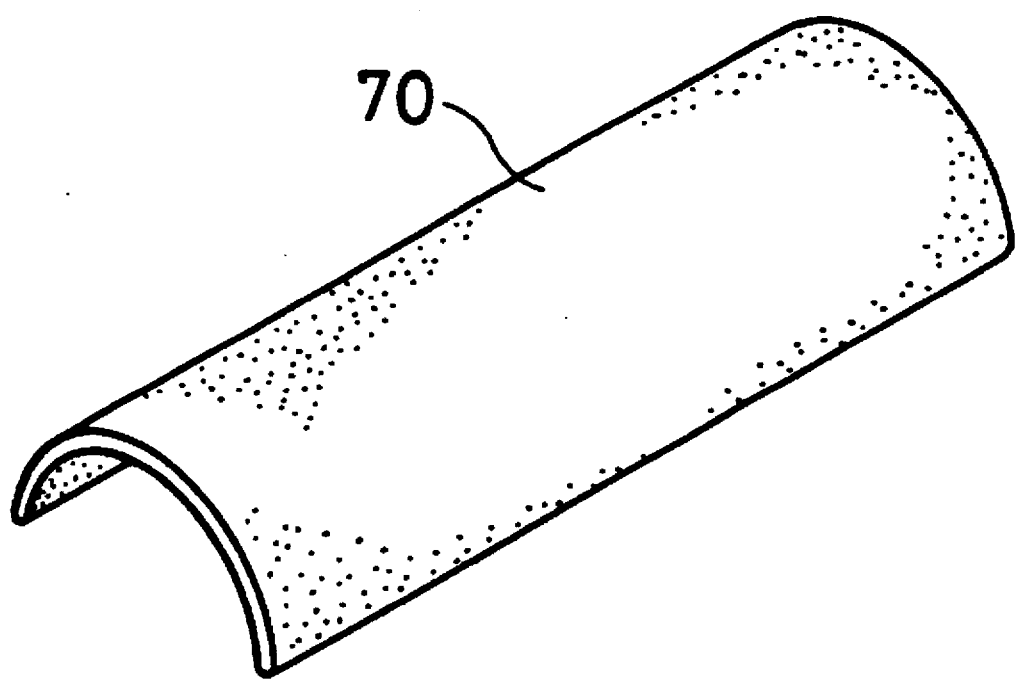
FIG. 19 is a perspective view of a molded product shaped in the seventh embodiment of the invention.

In the molding step E1, there is described an example that molds a semicylindrical product referring to FIGS. 18 and 19.

FIG. 18 is a schematic view showing a molding apparatus of the seventh embodiment of the noncombustible molded product of the invention. FIG. 19 is a perspective view of a molded product shaped in the seventh embodiment of the invention.

In the figures, a slurry 61 is prepared by the above paper stock preparing step which uses a sepiolite as a main material and which adds thereto a flocculant of a combination of a strong cation polymer and a strong anion polymer. The slurry 61 is stored in a slurry tank 62. A molding apparatus 63 has a main body 64. The main body 64 is composed of a generally semicylindrical wire cloth die mount 64a made of steel or the like, and a suction pipe 64b connected tightly thereto while communicating with an air hole formed on an upper end of the mount 64a. A wire cloth die 65 is detachably mounted on an opened face of the mount 64a via a holder 66. The die 65 serves as molding die, and is formed of a wire cloth of 50 to 80 meshes in accordance with a shape of a molded product in consideration of a plate thickness thereof. A hose 67 has its one end connected with the main body 64 and opposite end with a vacuum pump 68. A semicylindrical molded paper layer 69 is attached to a whole surface of the die 65. A molded product 70 is finished by dehydrating and drying the molded paper layer 69.

For manufacturing the molded product 70 by use of the molding apparatus 63 constructed as above, the molded apparatus 63 is dipped into the slurry 61. Then the vacuum pump 68 is operated to vacuum the interior of the main body 64 of the apparatus 63. Thereby water around the main body 64 in the slurry 61 is filtrated by the die 65 and sucked into the main body 64 by the above suction force. On the other hand, solid substances mainly cake of substantially a uniform thickness while dehydrated by a predetermined amount so as to form the molded paper layer 69 on the whole surface of the die 65. The thickness of the molded paper layer 69 can be controlled by the vacuum pressure of the pump 68, suction time and the like. In the present embodiment, 0.5 to 2.0 mm thickness was obtained by sucking 10 to 30 seconds at 400 to 600 mmHg. Then the molding apparatus 63 is taken out of the slurry 61. Thereafter, air is injected into the main body 64 in a reverse direction to the sucking direction so as to release the molded paper layer 69 which is stuck on the surface of the die 65.

After finishing molding as above, there are carried out dehydrating and drying of the molded paper layer 69 since it contains a considerable amount of moisture.

First of all, in a preliminary drying step E2, the molded paper layer 69 is dried as a whole by a natural air drying or a heated air drying, thereby making its moisture content into 30 to 50%.

Next, in a cold press molding step E3, the molded paper layer 69 is set on a prescribed die for the purpose of smoothing of its surface, lamination with a dissimilar material, embossing, regulation of its thickness or the like. Then it is applied with a pressure of 10 to 30 kg/cm$^2$ so as to decrease its moisture content to 20 to 30%.

Then, in a trimming step E4, the layer 69 is faired by cutting ends or the like.

Thereafter, in a drying step F, the molded paper layer 69 is dried predetermined time at an atmosphere temperature of about 120 degrees centigrade while held in a fixed shape by a retaining die. Thus the paper layer 69 has its interior moisture evaporated so as to hasten its condensation, thereby being dried and solidified.

Through the above steps, there is completed the molded product 70 of a very small thickness of 0.2 to 1.0 mm that is never seen in conventional molded products. It is possible to mold it into 5.0 mm thickness by controlling sucking time, slurry concentration, etc. The molded product 70 has high heat resistance and smolders little or only becomes sooty if it is exposed to fire, thereby keeping its fixed shape.

As mentioned above, the noncombustible molded sheet of the present embodiment is obtained by preparing the slurry 61 from the sepiolite as the main material and the flocculant added in the total amount of 0.2 to 1.0% by weight to a solid content of the raw material, the flocculant being composed of the DMAEM of the strong cation polymer and the AA of the strong anion polymer, dipping the molding die 65 of the wire cloth into the slurry 61, and sucking it to form the molded paper layer 69 on the die 65, and releasing and dehydrating and drying it.

According to the above embodiment, the molded product 70 is cheap, heat resistant and water proof with a high strength, since it has the sepiolite of the inorganic fiber as the main material. Moreover, the product 70 can be made very thin, has flexibility and good workability and is excellent in designs.

The noncombustible molded sheet of the present embodiment is manufactured by the macerating step A for preparing the slurry 61 of the sepiolite as the main material, the paper stock preparing step composed of the raw material mixing step B, the treating step C and the storing step D, the molding step E1 for forming the molded paper layer 69 of the die 65 by dipping the die 65 into the slurry 61 and sucking it, the preliminary drying step E2 as the drying step for dehydrating and drying the paper layer 69 after releasing it from the die 65, the cold press molding step E3 and the drying step F.

According to the above method, it is easy to obtain molded products on the die 65 by simple steps of dipping the die 65 in the slurry 61 of the sepiolite as the main material and sucking it.

Moreover, in the above embodiment, the flocculant is the combination of the strong cation polymer and the strong anion polymer in the molding on the die 65. Therefore, it forms ion complex with the prepared slurry mainly composed of the sepiolite and is made insoluble to decrease adhered water. Thus hydrophilic property thereof is lowered to tighten floccs, thereby making floccs of high yield that are strong to bear mechanical shocks such as pumping up, stirring, turbulent flow and the like. Then the paper making performance can be improved, thereby enabling paper making of the slurry 61 on mass-production basis that is excellent in productivity and profitability.

This invention may be practiced or embodied in still other ways without departing from the spirit and essential character thereof. For instance, while the first binder of the thermoplastic resin is composed of PAA, the second binder of the thermosetting resin is composed of EPA, the third binder of the thermoplastic resin is composed of AA, and the fourth binder of the thermoplastic resin is composed of DMAEM in the first embodiment, other synthetic polymer or natural polymer may alternately be usable. Also, only one kind of resin may be used as the thermosetting resin or the thermoplastic resin, or two or more kinds of resin may be mixed therefor.

While the DMAEM and AA are used as the strong cation polymer and the strong anion polymer in the second embodiment, any kinds of strong cation polymer and strong anion polymer may be chosen as desired, if it is usable for a flocculant. Moreover, while the flocculant of the second embodiment is the combination of the strong cation polymer and the strong anion polymer, it is possible in some cases to make paper on mass-production basis by use of the strong anion polymer alone as the added flocculant depending on practice condition, since the sepiolite has cations in itself.

The mixing ratio of the sepiolite, flocculant, reinforcer, reinforcing fibers, etc. in the above embodiments is not limited in the ratio shown in each embodiment. It is all right to select the best one according to physical properties, freeness, manufacturing methods, uses, etc.

In addition, while the noncombustible sheet of the above embodiments is mixed with a glass fiber as the reinforcer, a variety of reinforcers may alternately be used such as rock wool fiber, stainless fiber and whisker. However, the glass fiber are the best in terms of material costs, floccing efficiency, etc. Here, it is not always necessary to mix the reinforcer depending on purposes. In case of this mode that omits the use thereof, the mixing step of the reinforcer can be eliminated so as to simplify the work. Moreover, it is possible to give a smooth feeling to the sheet, contrary to the one mixed with the glass fiber with a stiff feeling. Similarly, it is not always necessary to mix the wood pulp or the synthetic fiber as the reinforcing fiber, either. They may be used as desired in consideration of paper making performance, uses, etc.

The noncombustible sheets of the first and the second embodiments are practicable in wall decorating materials, sealants, decorative papers for building, etc. Otherwise, they may be used while stuck on opposite surfaces of heat insulating materials so as to prevent fuzzing or peeling off of fibers thereof. Or they can be used as insulators.

The noncombustible sheet may be made into a thickness of about 10 mm, or into concavo-convex shape, so it is usable for noncombustible materials of a cubic shape.

Moreover, while the third and fourth embodiments use the aluminium foil 2 as the metallic foil, other kinds of metallic foils may be used, such as a stainless foil, copper foil or the like, for example.

While the third embodiment uses the noncombustible sheet 3 made from the slurry mainly composed of the sepiolite, a variety of inorganic agents may alternately be used if they are suitable at the working temperature of the inorganic adhesive 4. Including this and other embodiments, it is possible to use an organic adhesive in an amount of 5% or less in its organic solid content, as desired.

While the third and fourth embodiments show an example using a wet lamination processing as their manufacturing methods, other kinds of processing methods can alternately be used such as a thermal lamination, hot melt lamination, a nonsolvent lamination, a dry lamination, etc.

In addition, while the laminated sheet 1 or 21 of the above embodiments relate to a double layer structure of the aluminium foil 2 or 22 and the noncombustible sheet 3 or 23, it is possible to make it a three or more layer structure by combining properly the metallic foil or noncombustible sheet.

While the honey comb cores of the fourth to sixth embodiments are made by the method of coating the honey comb forming inorganic adhesive in a plurality of lines on the noncombustible sheet at positions shifted by half pitches, and expanding them after laminating in plural, they may be obtained by a roll core method or a corrugation core method, for example.

The honey comb core 41 of the fifth and sixth embodiments may have their cavities of the cells filled with heat insulating materials such as foaming agents. In this case, heat insulating effects can be heightened in addition to the above mentioned effects. Also it is possible to give sound absorption property.

An inorganic impregnant may be coated on the surface of the honey comb core 34 of the fourth embodiment.

While the seventh embodiment is concretized in the molded product 70 of a semicylindrical shape, it can mold articles that are unable to be molded by general synthetic resin moldings or metal press, e.g. reliefs, articles of concavo-convex shape by embossing, molded products like dishes, cups or the like, articles of cylindrical shape or elbow shape, etc.

The molded product 70 may be made thick for use as a board or the like, or used with its surface made irregular or in a three dimensional shape.

Moreover, the molded product 70 may be obtained not only by an integral molding but also by joining the ends thereof via viscosity of the paper layer 69 or by sticking the ends via an adhesive after its molding and drying.

The preferred embodiments described herein are therefore illustrative and not restrictive, the scope of all variations which come within the meaning of the claims are intended to be embraced therein.

What is claimed is:

1. A noncombustible sheet made of a slurry containing a major proportion of sepiolite, a first binder for fixation composed of an anion thermoplastic resin and a second binder for flocculation and water resistance composed of a cation thermosetting resin wherein said first binder is a polyacrylamide thermoplastic resin having a molecular weight of 800,000 to 1,000,000 and said second binder is a thermosetting resin having a network of three dimensional structure.

2. The noncombustible sheet according to claim 1, further comprising inorganic fibers as a reinforcer.

3. The noncombustible sheet according to claim 1, further comprising a third binder for flocculation composed of an anion thermoplastic resin and a fourth binder for flocculation composed of a cation thermoplastic resin.

4. The noncombustible sheet according to claim 1, wherein said second binder is a high molecular flocculant composed of a mixture of a strong cation polymer and a strong anion polymer in a total amount of 0.2 to 1.0% by weight based on the solids content of the slurry.

5. The noncombustible sheet according to claim 4, wherein the strong cation polymer is present in an amount ranging from 25 to 75% by weight of the high molecular flocculant.

6. The noncombustible sheet according to claim 1, wherein the strong anion polymer is present in an amount ranging from 0.1 to 0.5% by weight based on the solids content of the slurry in a fixed condition.

7. The noncombustible sheet according to claim 1, further comprising a metallic foil joined to a surface of said sheet with an inorganic adhesive.

8. The noncombustible sheet according to claim 1, further comprising inorganic fibers as a reinforcer in a mixing ratio of inorganic fibers to sepiolite ranging from 15/85 to 20/80 by weight.

9. The noncombustible sheet according to claim 8, in which the second binder has a network of three dimensional structure.

10. The noncombustible sheet according to claim 9, in which the first binder is a polyacrylamide which increases paper strength having a molecular weight of 800,000 to 1,000,000, and the second binder is a polyamide-polyamine-epichlorohydrine.

11. The noncombustible sheet according to claim 10, in which the first binder is added in an amount of 1.0 to 2.0% by weight of the solid content of the slurry in a fixed condition, and the second binder is added in an amount of 2.0% by weight based on the solids content of the slurry in a fixed condition.

12. The noncombustible sheet according to claim 10, further comprising a high molecular flocculant composed of an anion thermoplastic resin.

13. The noncombustible sheet according to claim 12, in which the anion thermoplastic resin as the high molecular flocculant is selected from the group consisting of a polyacrylamide and an acrylamide-acrylic-acid copolymer.

14. The noncombustible sheet according to claim 13, in which the anion thermoplastic resin as the high molecular flocculant is a polyacrylamide of molecular weight of 8,000,000 to 10,000,000 for hastening fixation of the first and second binders to the slurry as well as for improving freeness.

15. The noncombustible sheet according to claim 14, in which the polyacrylamide as the high molecular flocculant is added in an amount of approximately 0.2% by weight based on the solids content of the slurry in a fixed condition.

16. The noncombustible sheet according to claim 12, in which the high molecular flocculant is composed of a strong anion thermoplastic resin which is at least 20% disaggregated into anions in an amount of 0.1 to 0.5% by weight based on the solids content of the slurry.

17. The noncombustible sheet according to claim 12, in which the high molecular flocculant is further composed of a cation thermoplastic resin.

18. The noncombustible sheet according to claim 17, in which the anion thermoplastic resin as the high molecular flocculant is one selected from the group consisting of a polyacrylamide and an acrylamide-acrylic-acid copolymer, and the cation thermoplastic resin as the high molecular flocculant is selected from the group consisting of a polyacrylamide and a dimethyl-amino-ethyl-methacrylate.

19. The noncombustible sheet according to claim 18, in which the mixing ratio of the first and second binders and the high molecular flocculant to a solid content of the slurry is such that the first binder is not more than 2.0% by weight, the second binder is not more than 2.0% by weight, the anion thermoplastic resin and the cation thermoplastic resin are 0.2 to 1.0% by weight in total, while a mixing ratio of the anion thermoplastic resin to the cation thermoplastic resin is 25/75 to 75/25 by weight.

* * * * *